US009460155B2

(12) United States Patent
Verma

(10) Patent No.: US 9,460,155 B2
(45) Date of Patent: Oct. 4, 2016

(54) METHOD AND SYSTEM OF CONTINUOUS CONTEXTUAL USER ENGAGEMENT

(71) Applicant: Kunal Verma, Sunnyvale, CA (US)

(72) Inventor: Kunal Verma, Sunnyvale, CA (US)

(*) Notice: Subject to any disclaimer, the term of this patent is extended or adjusted under 35 U.S.C. 154(b) by 89 days.

(21) Appl. No.: 14/198,523

(22) Filed: Mar. 5, 2014

(65) Prior Publication Data

US 2015/0254561 A1 Sep. 10, 2015

Related U.S. Application Data

(60) Provisional application No. 61/773,145, filed on Mar. 6, 2013, provisional application No. 61/948,489, filed on Mar. 5, 2014.

(51) Int. Cl.
*G06F 17/00* (2006.01)
*G06F 17/30* (2006.01)

(52) U.S. Cl.
CPC ... *G06F 17/30507* (2013.01); *G06F 17/30463* (2013.01)

(58) Field of Classification Search
CPC .................. G06F 17/30463; G06F 17/30507; G06N 5/04
USPC .......................................................... 707/713
See application file for complete search history.

(56) References Cited

U.S. PATENT DOCUMENTS

| | | | | |
|---|---|---|---|---|
| 6,044,347 A * | 3/2000 | Abella | ..................... | G10L 15/18 704/272 |
| 6,356,869 B1 * | 3/2002 | Chapados | ................ | G10L 15/22 704/270 |
| 7,139,752 B2 * | 11/2006 | Broder | ............... | G06F 17/30616 |
| 7,546,382 B2 * | 6/2009 | Healey | ....................... | G06F 8/00 704/1 |
| 8,275,803 B2 * | 9/2012 | Brown | .............. | G06F 17/30654 705/14.44 |
| 8,677,377 B2 * | 3/2014 | Cheyer | .................. | G09B 21/00 719/310 |
| 2004/0083092 A1 * | 4/2004 | Valles | ................. | G06F 17/2785 704/9 |
| 2004/0230637 A1 * | 11/2004 | Lecoueche | ............. | G10L 15/20 709/200 |
| 2005/0080628 A1 * | 4/2005 | Kuperstein | ......... | H04M 3/4938 704/270.1 |
| 2006/0031853 A1 * | 2/2006 | Kuperstein | ......... | H04M 3/4938 719/320 |
| 2006/0053000 A1 * | 3/2006 | Moldovan | ......... | G06F 17/30401 704/9 |
| 2007/0100790 A1 * | 5/2007 | Cheyer | .................. | G09B 21/00 |
| 2008/0015864 A1 * | 1/2008 | Ross | .................... | G10L 15/1822 704/275 |

(Continued)

OTHER PUBLICATIONS

Ababneh, Mohammad, et al., "An Ontological Inference Driven Interactive Voice Recognition System", STIDS 2013, George Mason Univ., Fairfax, VA, Nov. 12-15, 2013, pp. 125-132.*

(Continued)

*Primary Examiner* — Robert Stevens

(57) ABSTRACT

In one exemplary aspect, a contextual user engagement system for automatically engaging in a conversation with a user is provided. A context manager manage, with at least one processor, the context of the conversation with a user. The context manager receives a user utterance, wherein the context manager calls the other modules of the contextual user engagement system to obtain information with respect to the user utterance. The context manager maintains a context object for a conversation with a user. The context manager automatically updates the context object based on an information detected by the other modules of contextual user engagement system. A content knowledge database stores a content knowledge of the contextual user engagement system. The content knowledge includes a history of interactions with the user. An information extraction engine extract information from a specified source based on a set of rules.

14 Claims, 27 Drawing Sheets

(56) References Cited

U.S. PATENT DOCUMENTS

2012/0016678 A1* 1/2012 Gruber ............... G06F 17/3087
704/275
2012/0330924 A1* 12/2012 Rajan ............... G06F 17/30463
707/714

OTHER PUBLICATIONS

Schiaffino, Silvia, et al., "Building respectful interface agents", International Journal of Human-Computer Studies, vol. 68, Issue 4, Apr. 2010, pp. 209-222.*

Maybury, Mark T., "Intelligent Visual Interfaces: An Introduction", AVI-10, Rome, Italy, May 29, 2010, 132 pages.*

Knappmeyer, Michael, et al., "Survey of Context Provisioning Middleware", IEEE Communications Surveys & Tutorials, vol. 15, No. 3, Third Quarter 2013, pp. 1492-1519.*

Lee, Cheongjae, et al., "A Situation-Based Dialogue Management Using Dialogue Examples", ICASSP 2006, Toulouse, France, May 14-16, 2006, pp. I-69-I-72.*

Jung, Sangkeun, et al., "Using Utterance and Semantic Level Confidence for Interactive Spoken Dialog Clarification", Journal of Computing and Science Engineering, vol. 2, No. 1, Mar. 2008, pp. 1-25.*

\* cited by examiner

```
CONTEXT_ENGINE (CONTEXT_OBJECT, NEW_EXTRACTED_TOPICS,
NEW_ATTRIBUTES)
  if any topics or attributes in CONTEXT_OBJECT are listed as
     transitional: remove them from CONTEXT_OBJECT
  for each E_ATTR in
     EXTRACTED
     ATTRIBURE: if
     E_ATTR is in
     CONTEXT_OBJECT:
        if value of E_ATTR is same as value of the same attribute in the context
           object: update confidence score for that attribute using arithmetic mean
        if value of E_ATTR is different than value of the same attribute in the context
           object: lookup semantic model for constraints on E_ATTR
           if E_ATTR is listed as SINGULAR:
              over-write the attribute in context object E_ATTR
           else:
              ADD E_ATTR to CONTEXT OBJECT
     else if E_ATTR is not in CONTEXT OBJECT:
        ADD E_ATTR to CONTEXT OBJECT
  for each E_TOPIC in EXTRACTED_TOPIC identified as ADDITIVE:
     add E_TOPIC to CONTEXT_OBJECT as ADDITIVE TOPIC
  for each E_TOPIC in EXTRACTED_TOPIC identified as NEGATED:
     add E_TOPIC to CONTEXT_OBJECT as NEGATED TOPIC
  Map each topic that is a sub-class of a certain class to it attribute listed in domain config file
```

```
RULE_ENGINE(SENTENCE, LIST OF RULES)
for each word w in sentence:
    for each Rule R with a pattern P such that:
        first token of P matches w or first token of P is construct such as
        ?OR, ?OPT, ?TYPE, etc.:
        M = Match_Sentence_To_Pattern (sentence starting from w, P)
        if M is equal to "MATCH"
            add assert all facts in the action construct to the context object
if there are any mutually exclusive values extracted, remove them
Use the combining evidence technique discussed to calculate final
confidence score for each attribute
```

```
Match_Sentence_To_Pattern (Sentence, Pattern):
p = first token in pattern
s = first word in sentence
LOOP: if p is a word and s is a not at the end of sentence:
if p is equal to s:
if p is the last token in pattern:
return MATCHED
end
else if p is not the last token in pattern:
move p to next token
move s to next word
if p is a construct such ?OR or ?OPT:
pass rest of sentence and pattern to function for the construct
//Note that construct function returns whether match is true and
an offset denoting
// number of words in sentence that matched the construct
if that function returns true:
if p is the last token in pattern:
return MATCHED
end
else if p is not the last token in pattern:
move p to next token
increment s by the offset
go back to LOOP
```

```
{
'name': 'loc_01',
'repeat': True,
'standalone': True,
'trigger':[
{'attr':'locality', 'val':None, 'min_conf':None}
],
'dialog':[
"Can you tell me the city?",
"Which city?",
"Do you have a city in mind?"
],
'response_verify': None,
                                        },
```

```
{
'name': 'group_01',
'repeat': False,
'standalone': True,
'trigger':[
{'attr':'groups_goodfor', 'val':None, 'min_conf':None},
{'attr':'event_type', 'val':'birthday', 'min_conf':None},
],
'dialog':[
"How many people are coming?",
"How many people will be in your group?"
],
'response_verify': [
{
'rid': 'r_num_ppl',
'response': [{'id':'r_num_ppl_001',
'pattern': '?VAL',
'action': [{'valType':'Num', 'valXform':RuleAux.num_x_groupsize, 'attr':'s_group_size',
'val':'?VAL', 'confidence':1.0}],
},
'chain': 'romantic_01',
},
]
},
```

```
{
'name': 'suggest_sub_topics_interest_male_01',
'repeat': False,
'standalone': True,
'trigger':[
{'attr':'g_interest', 'val':'*', 'min_conf':None},
{'attr':'g_category', 'val':None, 'min_conf':None},
{'attr':'g_person_gender', 'val':'male', 'min_conf':None},
],
'expanded_dialog':{
'dialog' : ["{0} has the following related topics: ",
"{0} has the following related categories: "],
'format_attr_list' : ['g_interest'],
'expand_attr' : 'g_interest',
'relationship' : 'categoryRelatedToInterest',
'category_constraint' : [{'property' : 'relevantToGender', 'value' : 'Male'}]
},
'response_verify': None,
},
```

METHOD AND SYSTEM OF CONTINUOUS CONTEXTUAL USER ENGAGEMENT

CROSS-REFERENCE TO RELATED APPLICATIONS

This application claims priority to U.S. provisional patent application No. 61/773,145 filed on Mar. 6, 2013. This application also claims priority to U.S. provisional patent application No. 61/948,489 filed on Mar. 5, 2014. These applications are incorporated herein by reference.

BACKGROUND

1. Field

This application relates generally to natural language user interfaces, for domains such as expense management, enterprise mobility and e-commerce, and more specifically to a system, article of manufacture and method of continuous contextual user engagement.

2. Related Art

The increasing functionality of electronic devices, such as smart phones, is leading to a significant increase in their popularity. In turn, these trends are leading to an increase in the number and types of software applications that are available for use on these electronic devices. Users often utilize electronic devices to request services from applications. Increasingly natural language user interfaces are available to interact with various applications. Natural language user interfaces can perform such functions as recommendations and delegate requests to a set of services (e.g. search queries of databases or the Internet). Accordingly, a contextual user engagement system for automatically engaging in a conversation can increase user satisfaction with natural language user interfaces.

BRIEF SUMMARY OF THE INVENTION

In one aspect, a contextual user engagement system for automatically engaging in a conversation with a user is provided. A context manager manages, with at least one processor, the context of the conversation with a user. The context manager receives a user utterance, wherein the context manager calls the other modules of the contextual user engagement system to obtain information with respect to the user utterance. The context manager maintains a context object for a conversation with a user. The context manager automatically updates the context object based on information detected by the other modules of contextual user engagement system. A content knowledge database stores a content knowledge of the contextual user engagement system. The content knowledge includes a history of interactions with the user. An information extraction engine extracts information from a specified source based on a set of rules. A contextual topic engine extract topics and entities from text provided by a user based on a specified semantic model. A discourse manager provides an interactive dialog with the user. A natural language generation module generates an explanation for results and appropriate utterances to be communicated to the user. An inference engine infers a fact or a user intent based on at least one of an inference rules, the specified semantic model or a set of information in the context object. An Execution Engine creates a query plan for the query engine to execute. The query engine contains connectors for SQL/NoSQL databases, Enterprise Systems such as Oracle and ERP, an API engine and an engine for analyzing unstructured data.

BRIEF DESCRIPTION OF THE DRAWINGS

The present application can be best understood by reference to the following description taken in conjunction with the accompanying figures, in which like parts may be referred to by like numerals.

An example description of an operating principle of a context object update algorithm is provided in FIG. 5, according to some embodiments.

FIG. 6 provides an example of an extraction algorithm (e.g. a rule engine algorithm) of a probabilistic information extraction rule engine, according to some embodiments.

FIG. 7 provides an example pattern matching algorithm for a probabilistic information extraction rule engine, according to some embodiments.

FIGS. 8 A-B illustrate example applications of a rule-based natural language engine, according to some embodiments.

FIG. 9 depicts an example of a discourse state, according to some embodiments.

FIG. 10 depicts an example a discourse state with a response verify, according to some embodiments.

Figure 11:
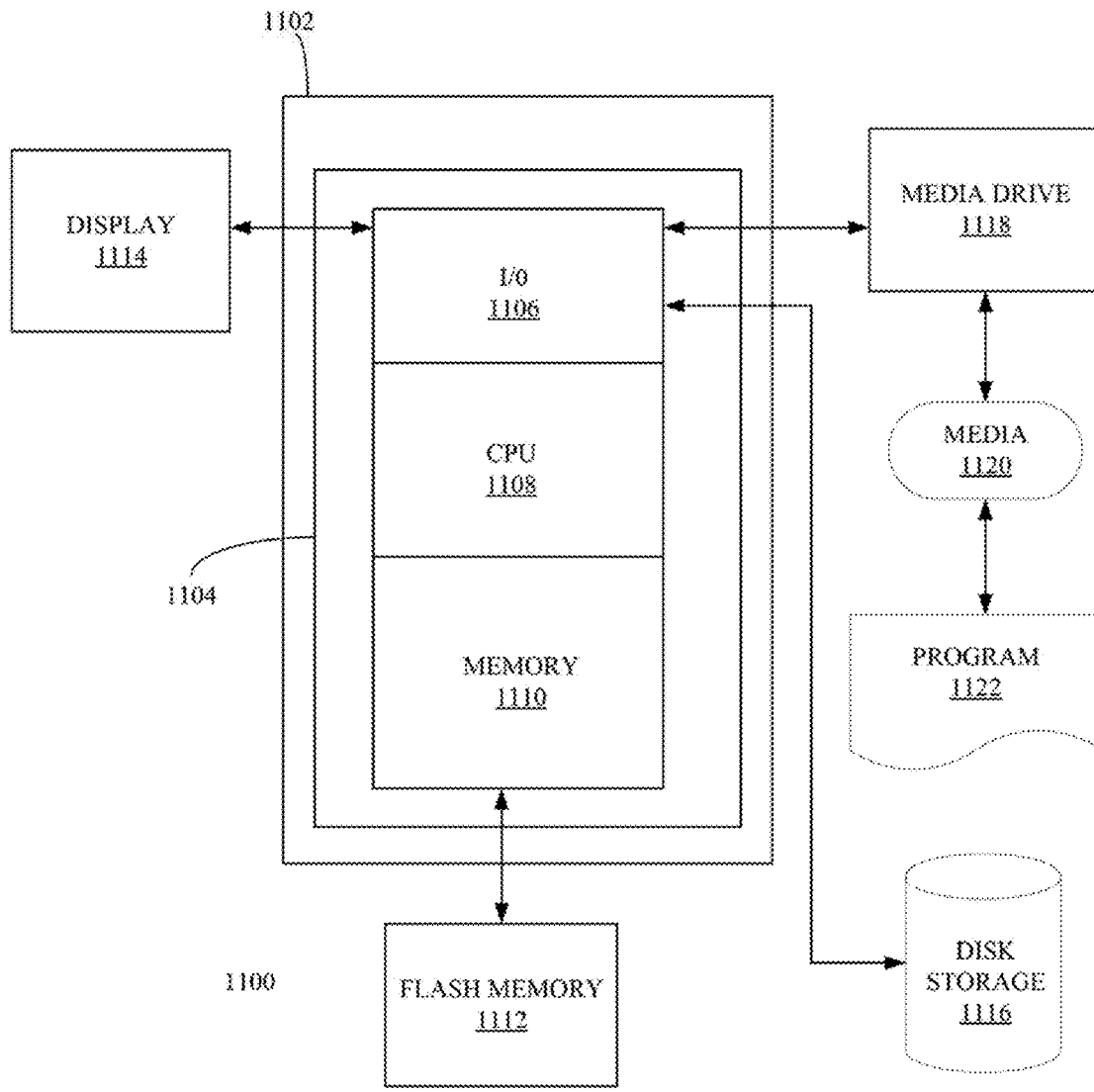

FIG. 11 depicts an exemplary computing system that can be configured to perform several of the processes provided herein.

Figure 12:
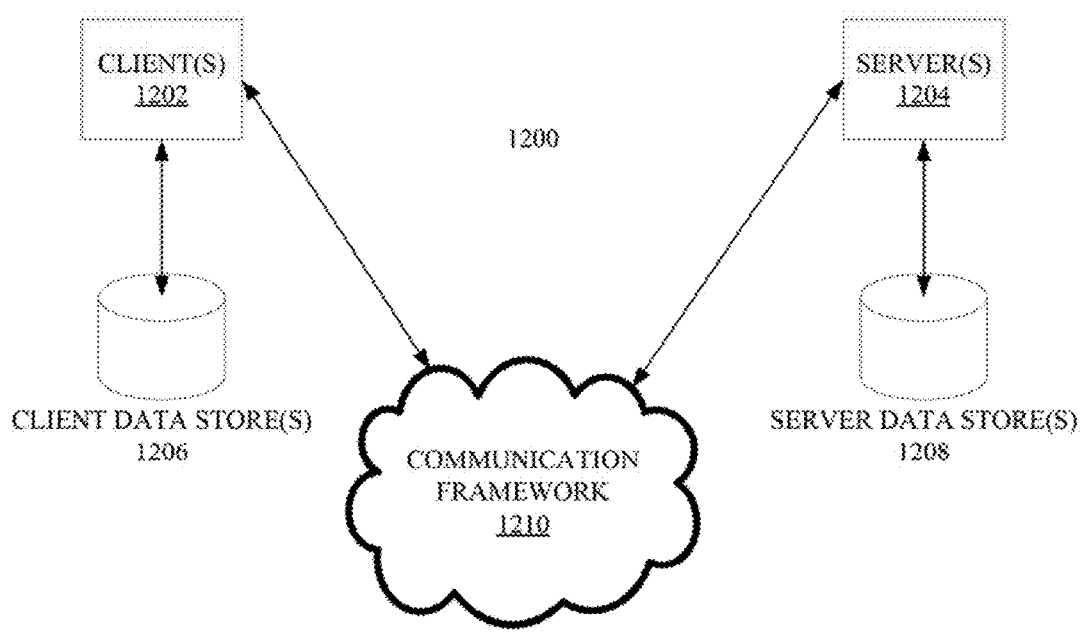

FIG. 12 is a block diagram of a sample computing environment that can be utilized to implement various embodiments.

FIGS. 13-20 depict an example set of screen shot views of example implementation of the systems and process provided herein, according to some embodiments.

FIG. 21 illustrates an example semantic discourse state, according to some embodiments.

Figure 22:
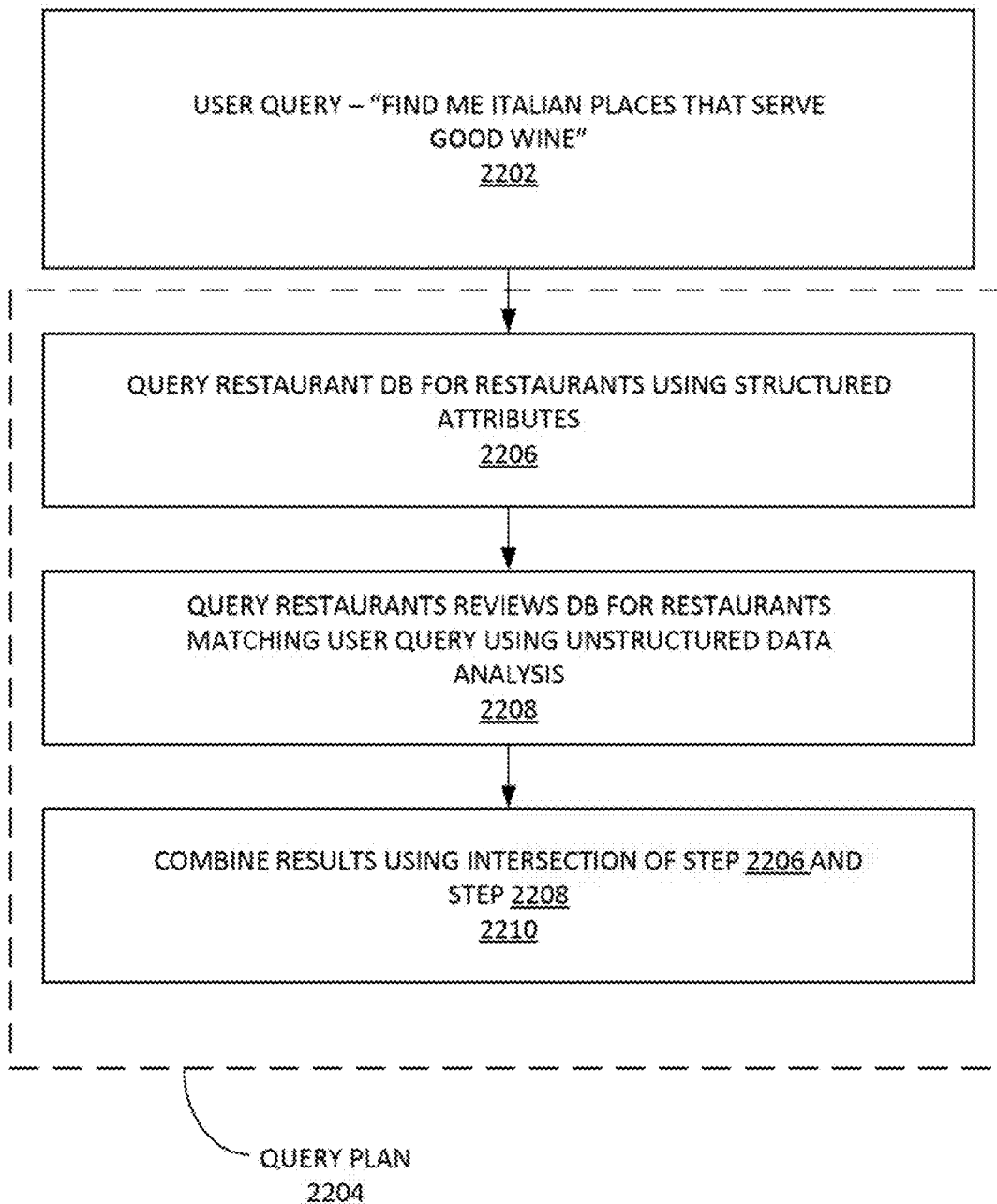

FIG. 22 illustrates an example of a query plan, according to some embodiments.

Figure 23:
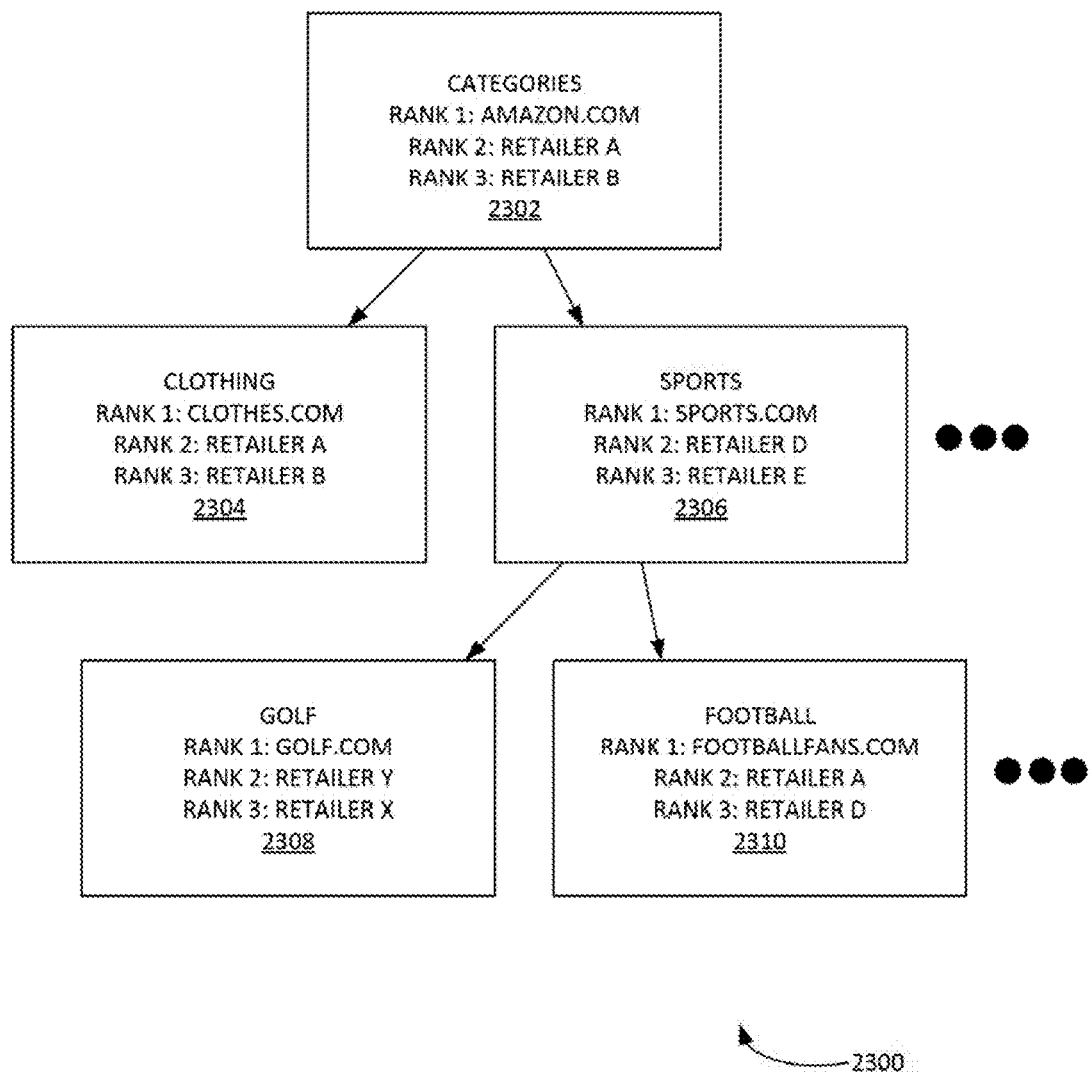

FIG. 23 illustrates an example of an API semantic registry, according to some embodiments.

Figure 24:
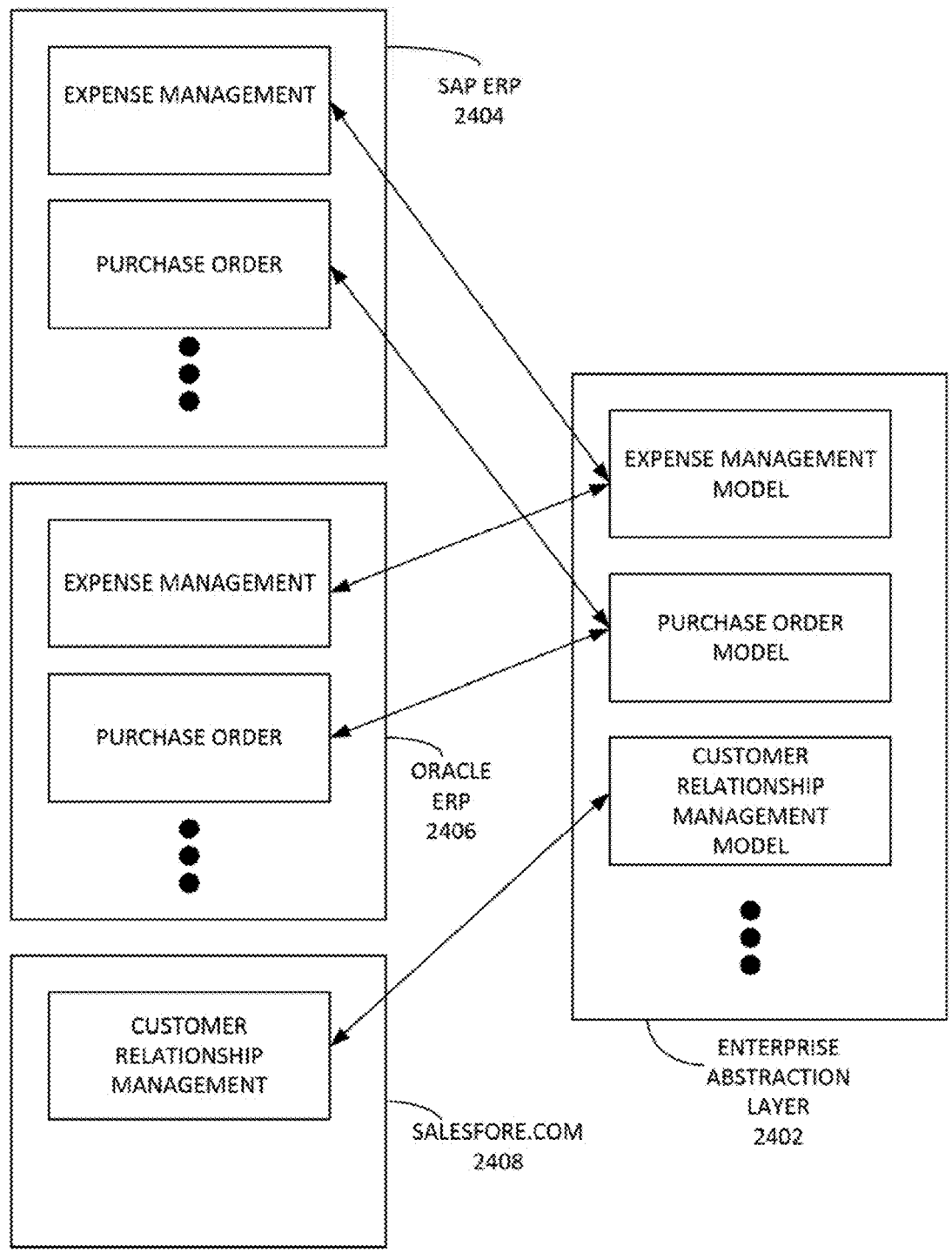

FIG. 24 illustrates an example implementation of an enterprise system connector layer (e.g. using enterprise system connector), according to some embodiments.

The Figures described above are a representative set, and are not an exhaustive with respect to embodying the invention.

DETAILED DESCRIPTION

Disclosed are a system, method, and article of continuous contextual user engagement. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

It is noted that data may be sampled in various locations and different time periods according there are several methods which may be used to select a proper sample size and/or use a given sample to make statements (within a range of accuracy determined by the sample size) about a specified population. These methods may include, for example:

1. Classical Statistics as, for example, in "Probability and Statistics for Engineers and Scientists" by R. E. Walpole and R. H. Myers, Prentice-Hall 1993; Chapter 8 and Chapter 9, where estimates of the mean and variance of the population are derived.

2. Bayesian Analysis as, for example, in "Bayesian Data Analysis" by A Gelman, I. B. Carlin, H. S. Stern and D. B. Rubin, Chapman and Hall 1995; Chapter 7, where several sampling designs are discussed.

3. Artificial Intelligence techniques, or other such techniques as Expert Systems or Neural Networks as, for example, in "Expert Systems: Principles and Programming" by Giarratano and G. Riley, PWS Publishing 1994; Chapter 4, or "Practical Neural Networks Recipes in C++" by T. Masters, Academic Press 1993; Chapters 15, 16, 19 and 20, where population models are developed from acquired data samples.

Exemplary System

A system and method that continuously engages the user to accomplish a wide range of tasks (e.g. refining search queries to find of information of interest, refining a plan to be executed such as party planning, filling complex expense forms, finding meeting rooms, querying enterprise systems such as expense management, financial systems and customer relationship management, etc.). The system can utilize rule based and statistical natural language processing (NLP)/natural language understanding (NLU) approaches to parse and understand the user's requests in natural language. As used herein NLP functionalities can include machine learning functionalities (e.g. statistical machine learning functionalities) to process natural language information.

As used herein, NLU can include various methods of machine reading comprehension. For example, the system can include a lexicon of the language and a parser and/or grammar rules to break sentences into an internal representation. The system can also include semantic theory functionalities to guide comprehension and interpretation capabilities. Semantic theory functionalities can include, inter alia: naive semantics, stochastic semantic analysis and/or pragmatics to derive meaning from context.

Rich semantic models and ontologies can also be utilized to reason about and infer additional context and information left implicit by the user. Discourse management techniques to guide the engagement with the user by asking questions in natural language to obtain clarification and/or additional information (e.g. not communicate) to perform the task at hand. System modules can communicate with and maintain facts based on ongoing dialog with the user in a context knowledge base.

Figure 1:
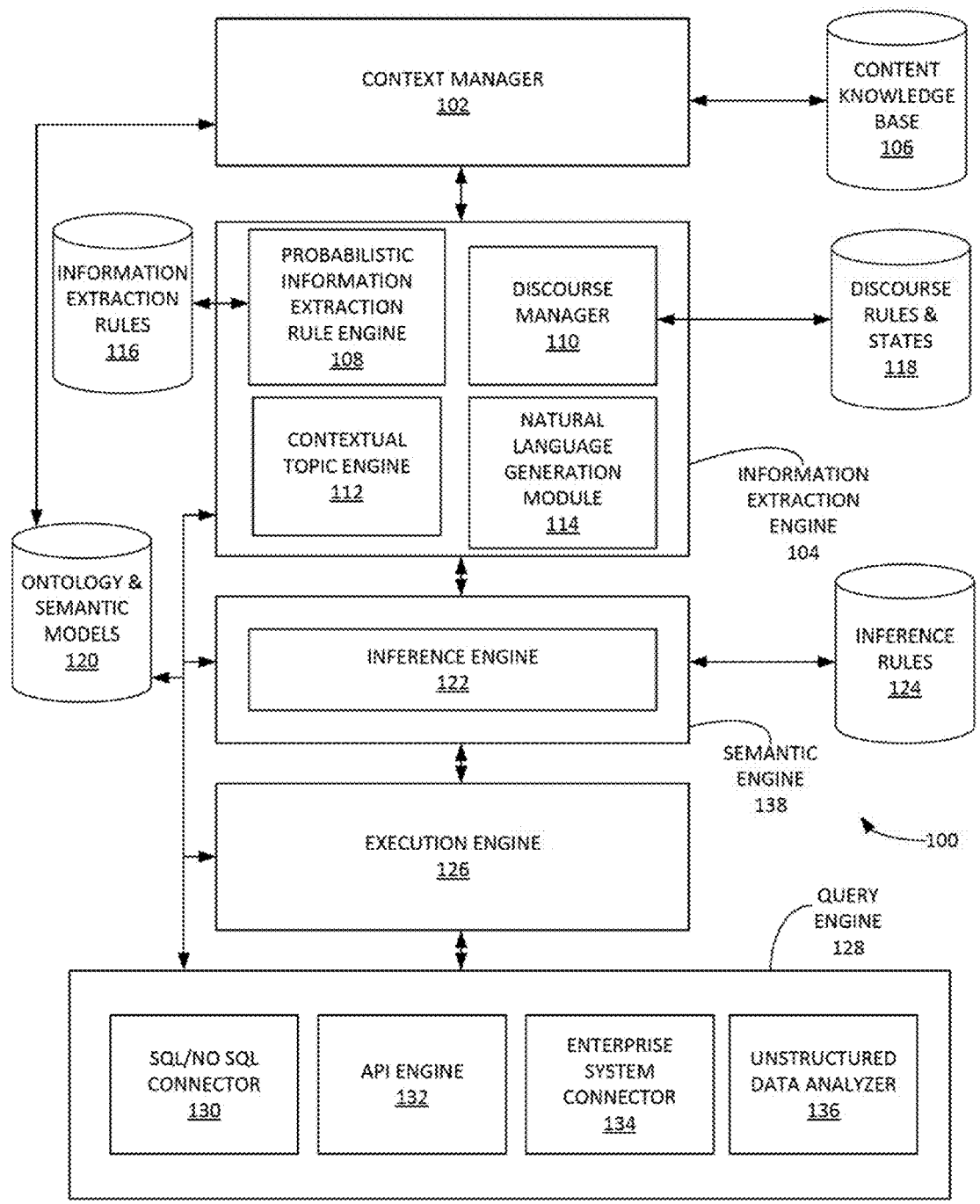
FIG. 1 depicts, in block diagram format, an example system for continuous contextual user engagement, according to some embodiments.

FIG. 1 depicts, in block diagram format, an example system 100 for continuous contextual user engagement, according to some embodiments. System 100 can include context manager 102. Context manager 102 can manages the context of the conversation with a user. Context manager 102 call the other modules of system 100 to obtain information as needed. Context manager 102 can maintain a context object for each conversation with a user. Context manager 102 can automatically update a context object based on new information detected/inferred by the other modules of system 100. The content knowledge can be stored in content knowledge base 106. Information extracted from the user's NL utterance and/or any additional knowledge inferred from an inference engine (e.g. inference engine 122) can be asserted to the context knowledge base. This context-knowledge base 106 can maintain the history of interactions with the user. The information in this context-knowledge base can be represented as semantic models. New information/knowledge from each interaction with the user from the same context can be integrated with existing knowledge from the same context. This knowledge integration can be performed using (but not limited to) a combination of the following techniques include, inter alia, the following techniques. Flexible semantic matching of new knowledge with existing knowledge to the common overlap between representations can be performed. Unification can be performed over the overlapping pieces to merge them into a coherent representation. Transformation rules and patterns can be applied to further enable better matches. Existing knowledge can be replaced with new knowledge when conflicting/contradictory information is detected. Conflicts/contradictions can be determined by semantic models and ontologies. For example, a semantic model can include a constraint for the location relation of an event.

Information extraction engine 108 can extract information from various sources based on a set of rules and/or patterns. For example, probabilistic information extraction rule engine 108 can extract complex attributes and/or facets from text based on specified information extraction rules and/or patterns. Key features can include the ability of users to extend the probabilistic information extraction rule engine 108 with domain specific rules and/or patterns 116. Users can also extend the probabilistic information extraction rule engine 108 by providing software code instructions for complex patterns. Probabilistic information extraction rule engine 108 can assign a probability to each extracted attribute feature based on such factors as number of occurrences, dealing with negation, etc. Information extraction engine 104 can extract complex attributes and facets from text (e.g. user input) based on information extraction rules and patterns. Key features can include the ability of users to extend information extraction engine 104 with domain-specific rules and/or patterns. Users can also extend information extraction engine 104 by writing code for complex patterns. Information extraction engine 104 can assign a probability to each extracted attribute feature (e.g. a confidence value as provided in FIG. 4 infra) based on number of occurrences, dealing with negation etc.

Contextual topic engine 112 can extract topics and/or entities from text based on semantic ontologies and models. Key features can include the concept of semantic 'breadcrumbs'. Semantic breadcrumbs can leverage the information in the context object to determine a most likely entity to be extracted and/or deal with negation. In one example, a user utterance can include a generic word, which can map to more than one candidate concepts. The contextual topic engine can use semantic matching between the context object and the candidate topics to identify the most likely topic. For example, the user may say—"I want helmets". The contextual topic engine can determine a number of candidate topics (e.g. baseball helmet, football helmet, bike helmet, etc.). The contextual topic engine can utilize semantic similarity between the context object and the candidate topics to determine a most likely topic. If the user had mentioned "I like football" in an earlier statement, the contextual topic engine can select "football helmet" from the candidate topics. However, in the event no semantic match is determine then all the topics can be returned.

Discourse manager 110 can provide an interactive dialog with the user. Discourse manager 110 can be configured by specifying a set of states and rules 118. Discourse manager 110 can be used to generate and manage and interactive dialog with the users. In one example, discourse manager 110 can follow a mixed initiative dialog paradigm. For example, discourse manager 110 can starts with asking questions, but users can change the dialog direction. Discourse manager 110 can understand the user even when the user enters input about details he was not asked about yet. The system designer can configure discourse manager 110 by specifying a set of states and scripts. At every query from the user, discourse engine 110 can check to see whether there are any states whose triggers evaluate to true by evaluating the facts in the context knowledge base. If there are any such states of one of them is executed and the appropriate dialog is shown to the user. If the state being executed has a response/verify construct then the discourse engine stays in the same state until it verifies the response, otherwise it goes back to evaluating which state to next evaluate. Discourse manager 110 can also include a help of a script specifies a set of states to be executed when a certain trigger evaluates to true. A discourse state can be of form: {trigger: t, dialog: d, responseVerify: rv, standalone: [T/F], repeat: [T/F]}. The discourse state can become ready to be executed if all assertions in trigger 't' are true in the context knowledge base. Dialog 'd' is used to specify a set of equivalent alternative dialogues to be shown to the user when the state is executed. 'responseVerify' variable 'rv' can specifies a set of patterns for each specific response that the discourse manager 110 can be expecting from the user. 'standAlone' variable can be used to specify the state can be executed outside a script. 'repeat' can be used to specify whether a state can be repeated if the trigger still evaluates to true after the state has been executed once, signifying that the user did not provide the appropriate response.

An example of a trigger construct of discourse manager 110 is now provided. The trigger construct can include a set of assertions which evaluate to true for an assertion to be executed. Each assertion can be of form (attr=value|min_conf) pair with confidence at least min_conf value (e.g. as specified by a system administrator). Each trigger consists of a set of assertions and each assertion can a three-tuple <attr, val, min_conf>> consisting of: attribute (attr) (e.g. a name of the attribute); value (val) (e.g. the value of the attribute); and/or minimum confidence (min_conf) (e.g. the assertion can have at least min_conf confidence in the context knowledge base). In one example, the trigger can evaluate to true when both the assertions also evaluate to true:

groups_good_for=None (no min confidence)
event_type=birthday (with at least 0.8 confidence)
'trigger':[{'attr':'groups_goodfor', 'val':None, 'min_conf':None}, {'attr':'event_type', 'val':'birthday', 'min_conf':0.8}], An example of a response-verify construct of discourse manager 110 is now provided. The response-verify construct can include a set of responses which discourse manager 110 can expect after a state is executed. Each response can be a three-tuple such as: <p, a, chain>. This example three-tuple can include pattern 'p' (e.g. the pattern of the response. Pattern 'p;' can be as the pattern construct in a rule-based NL engine. Action 'a' can include a set of assertions asserted in the context knowledge base when the state executes. Action 'a' can be the same as the action construct in a rule-based NL engine. Chain 'chain' can be the next state to be executed when the response is verified. In the example below, discourse manager 110 can expect a user to respond with either 'romantic' or 'honeymoon'. When the user as expected, the 'vacation_type=romantic' can be asserted with confidence 1.0 and discourse manger 110 can transition to a subsequent state such as romantic_01.

'response': [{pattern': 'romantic|honeymoon', 'action': [('valType':None, 'valXform':None, 'attr':'vacation_type', 'val':'romantic', 'confidence': 1.0)}],], 'chain': 'romantic 01'.

Additional information about discourse engine 110 is provided in FIGS. 9 and 10 infra.

Information and function (NLG) module 114 can generate explanations for results and appropriate utterances to be shown to the user NLG module 114 can generate natural language from a machine representation system such as a knowledge base or a logical form. NLG module 114 can convert a computer based representation into a natural language representation.

Inference engine 122 can infers new facts and/or user intent based on inference rules 124 and/or semantic models/ontologies 120, as well as all the information in a context object. In some embodiments, inference engine 122 can be included in a semantic engine 138 that also includes a semantic reasoner (not shown).

Query engine 128 can include connector(s) for such entities as SQL/NoSQL databases 130, an application programming interface (API) engine 132, an enterprise system connector 134 (such as Oracle and/or ERP), and/or an engine for analyzing unstructured data 136. The query engine 128 can generate a query plan based on the context object for the conversation and the configured data sources for that domain. The query plan can be represented using web services business process execution language (WS-BPEL). Query engine 128 can contain a rich set of connectors that allows it to connect to variety of data sources inside and outside the enterprise. The SQL/NoSQL connector 130 can leverage open source technologies (such as Hibernate®, Apache Tomcat®, and/or PyMongo®) to connect to relational databases and/or non-relational databases. The SQL/NoSQL databases 130 connector can provide the following capabilities, inter alia: declarative approach of specifying mappings; ability to assess data quality and automatically; generate data quality rules; ability to detect similar columns in relational databases. API engine 132 can provide various capabilities for API based services such as, inter cilia: calling both RESTful and SOAP-based services. APIs can be added for each domain, either as a list or in a proprietary semantic registry. APIs are ranked based on automated feedback from system. For example, for a category jewelry, if there are five (5) APIs then these can be ranked using various factors such as the number of results clicked by user and/or number of results returned. APIs can be bound at run-time to execution plans created by execution engine 126 by querying the semantic registry. Results from different APIs for same node can be combined based on the query plan created by execution engine 126. These results can include: results ranked by API rank; results ranked by match to query; results for top three (3) ranked APIs for a particular category etc. An example of an API semantic registry is provided in FIG. 23 infra.

The engine for analyzing unstructured data 136 can implement the extraction of attributes from unstructured data. For a corpus, point-wise mutual information is used to find terms that occur in each other's context exclusively (with four (4) words of each other). If a certain term pair has a certain frequency, it can be flagged as a potential attribute. For example, unstructured data can be matched to user queries. Term frequency-inverse document frequency (TF-IDF) vectors can be created from unstructured data such as restaurant reviews. Terms that occur in semantic model are given higher weights. TF-IDF vectors can be created from user queries and/or cosign similarity can be used to find reviews that are semantically close to the user query.

Enterprise system connector 134 can be based on creating semantic models for commonly used artifacts in enterprise systems. These models can have specific connectors for different existing enterprise systems including, but not limited to: SAP ERP®, Oracle ERP®, SalesForce CRM®, Microsoft Exchange, and/or Sharepoint®. The semantic models can provide integrated access to various enterprise systems. The models can include the ability to capture constraints in a dynamic fashion. For example, the connector can automatically extract policies for each type of expense and makes it available to downstream applications. The system of FIG. 1 can be used for interacting with e-commerce systems and enterprise systems such as expense management and customer relationship management.

Exemplary Processes

Figure 2A:
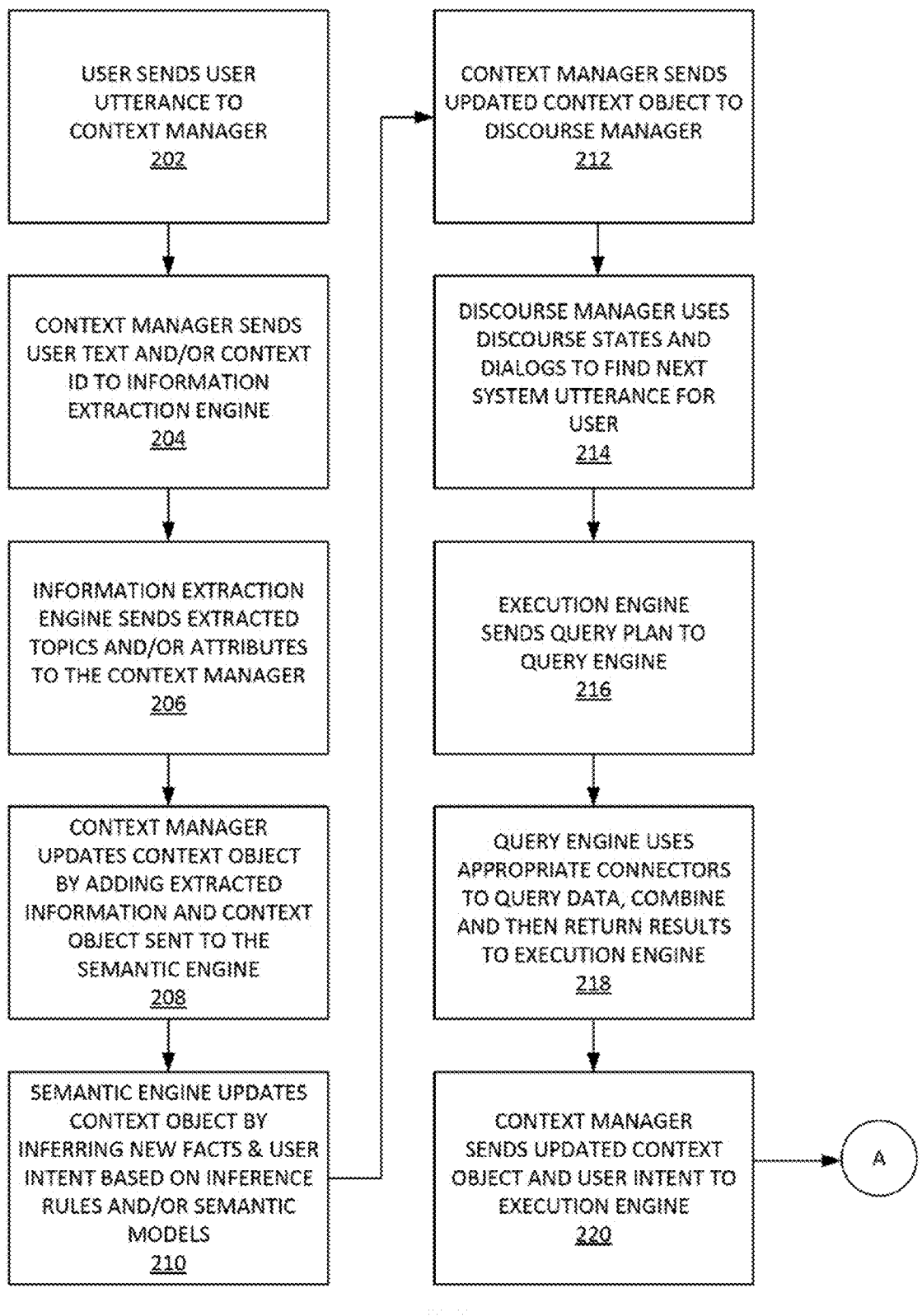
FIGS. 2 A-B depict, in block diagram format, a process for continuous contextual user engagement, according to some embodiments.
Figure 2B:
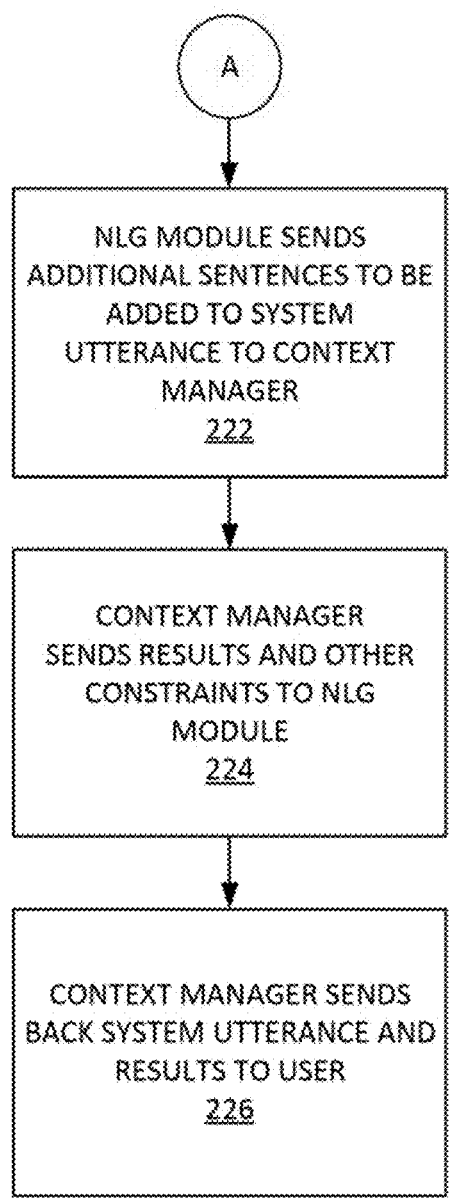

FIGS. 2 A-B depict, in block diagram format, a process 200 for continuous contextual user engagement, according to some embodiments. In step 202 o process 200, a user can send a user utterance (e.g. user input) to a context manager (e.g. context manager 102 of FIG. 1). In step 204, context manager can send user text and/or context identifier to extraction engine (e.g. information extraction engine 104 of FIG. 1). In step 206, the extraction engine can send extracted topics and/or attributes back to the context manager. In step 208, the context manager can then update the context object by adding the extracted information. The context object can then be sent to the semantic engine (e.g. semantic engine 138 of FIG. 1). In step 210, semantic engine can update the context object. For example, the semantic engine can infer new facts and user intent based on, inter alia, based on inference rules and/or semantic models. The inference rules can include one or more functions which take premises, analyzes their syntax, and returns one or more conclusions. The updates to the context object can be provided to the context manager. In step 212, the context manager sends the updated context object to the discourse manager (e.g. discourse manager 110 of FIG. 1). In step 214, discourse manager can use discourse states and dialogs to locate a next system utterance for the user. System utterances can refer to automatically generated responses for the system. Example system utterances can be: "Your expense systems requires Airlines names to also be filled for airfare expense type" and/or "I went looking for Italian restaurants that are kid friendly" In step 216, the execution engine (e.g. execution engine 126 of FIG. 1) can send a query plan to the query engine). In step 218, query engine (e.g. query engine 128 of FIG. 1) can use appropriate connectors to query the data and/or combine and return any results to the execution engine. In step 220, context manager can send the updated context object and user intent to execution engine. In step 222, the NLG module (e.g. NLG module 114) can send additional sentences to be added to the system utterance to the context manager. In step 224, the context manager can send results and other constraints to NLG module. In step 226, the context manage can return system utterances to user (e.g. a user device and/or application).

Figure 3:
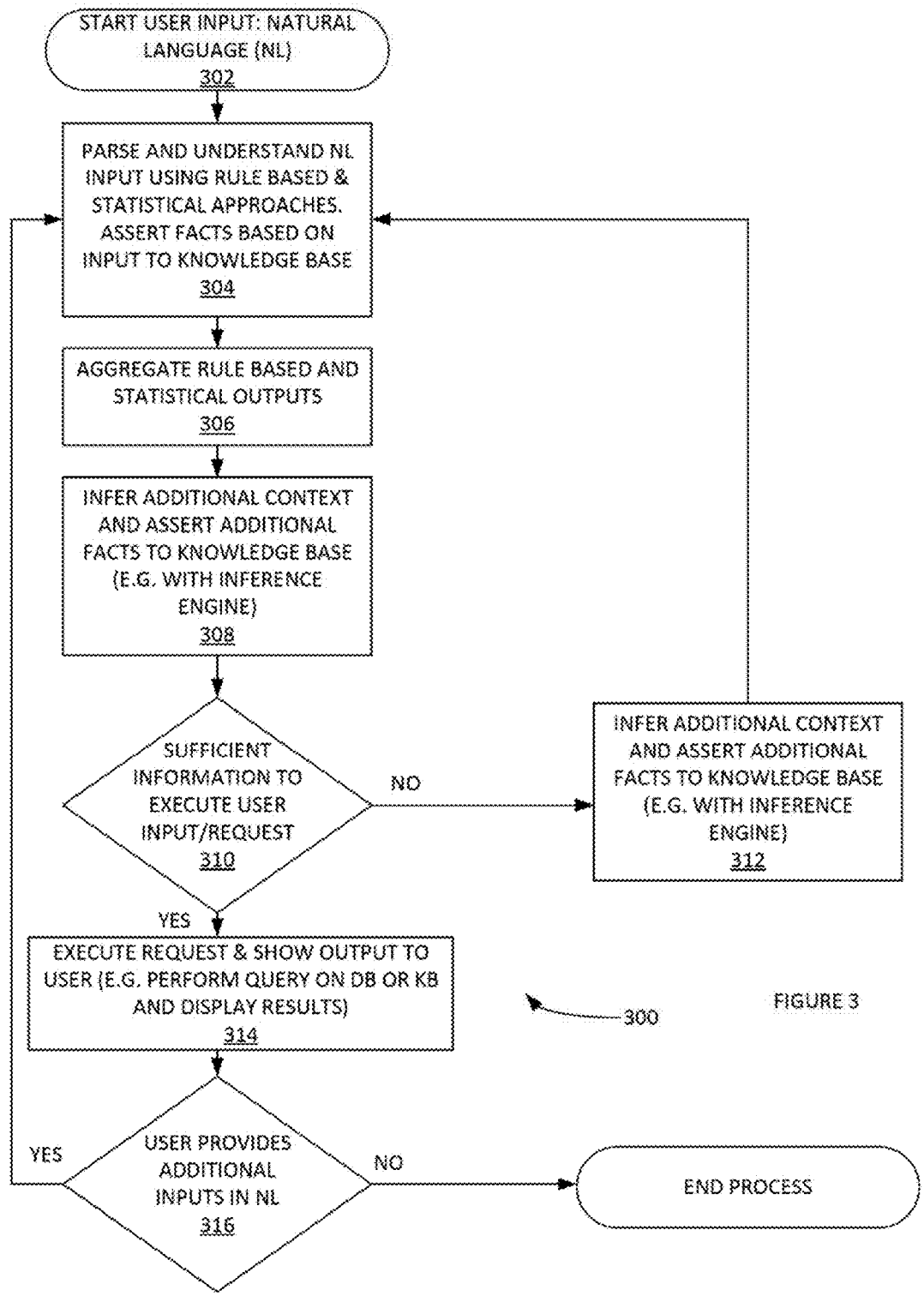
FIG. 3 illustrates an example process for processing user natural language (NL), according to some embodiments.

FIG. 3 illustrates an example process 300 for processing user natural language (A), according to some embodiments. In step 302 of process 300, a user inputs a NL, input. In step 304, the NL input can be parsed and interpreted (e.g. understood) using rule based and statistical approaches. Example statistical approaches can include statistical approaches that utilize machine learning techniques to extract attributes from text (see e.g. Katherina Probst, Rayid Ghani, Marko Krema, Andrew E. Fano, Yan Liu: Semi-Supervised Learning of Attribute-Value Pairs from Product Descriptions. IJCAI 2007: 2838-2843 and Doo Soon Kim, Kunal Verma, Peter Z. Yeh: Joint Extraction and Labeling via Graph Propagation for Dictionary Construction. AAAI 2013). Facts can be asserted based on input to knowledge base. In step 306, rule based and/or statistical outputs can be aggregated. In step 308, additional context can be inferred and additional facts to additional knowledge can be asserted. In step 310, it can be determined whether there is sufficient information to execute user request. If no, process 300 can proceed to step 312. In step 312, additional context can be inferred. Additional facts can also be asserted to the knowledge base. Process 300 can return to step 304. If yes, then process 300 can proceed to step 314. In step 314, the request can be executed. The output can be shown to the user (e.g. with a computer display). In step 316, it can be determined whether the user provides additional NI input. If yes, then process 300 can return to step 304. If no, then process 300 can be terminated.

Additional Exemplary Environment and Architecture

Figure 4A:
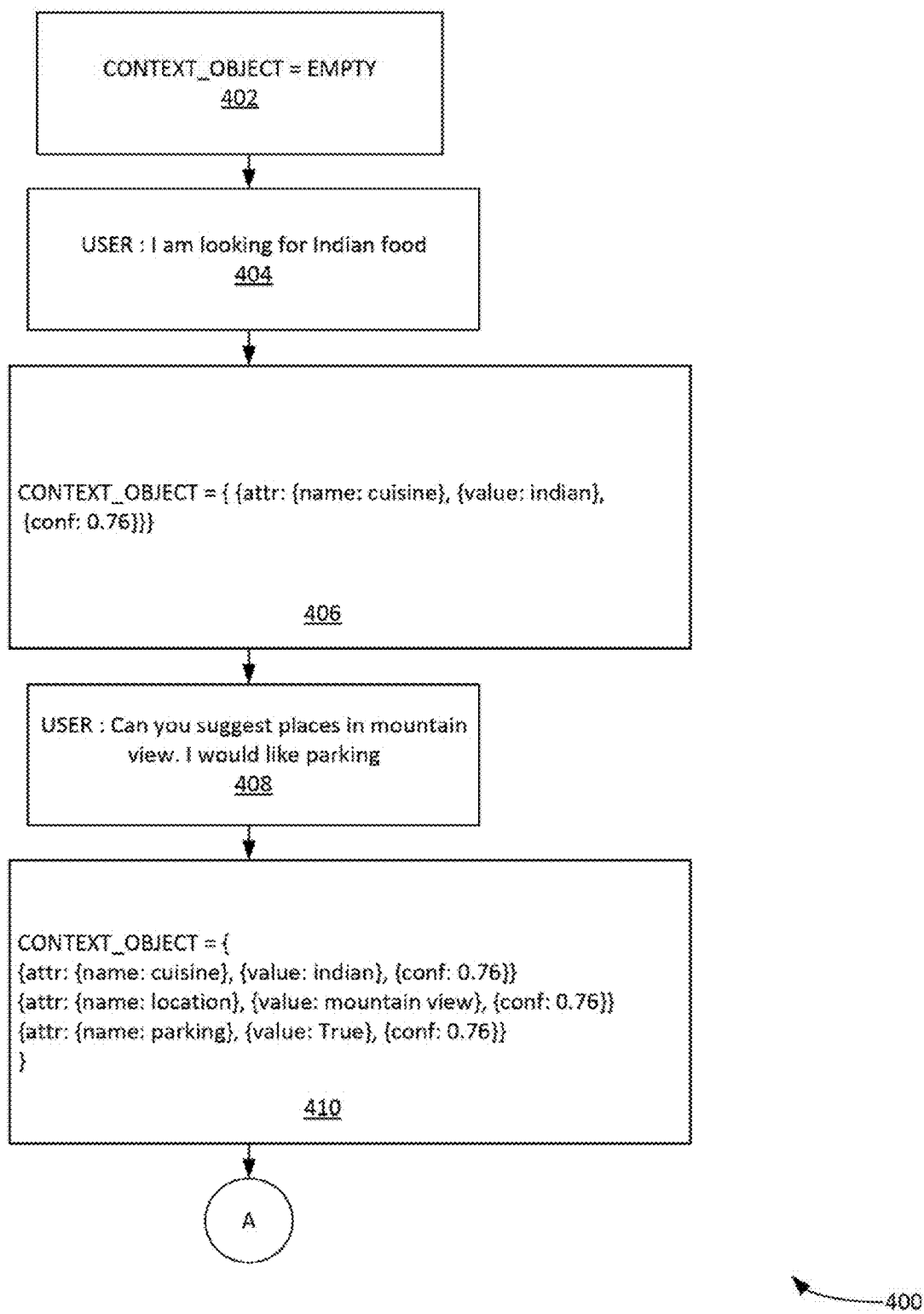
FIGS. 4 A-B illustrates an example of an implementation of a context object algorithm, according to some embodiments.
Figure 4B:
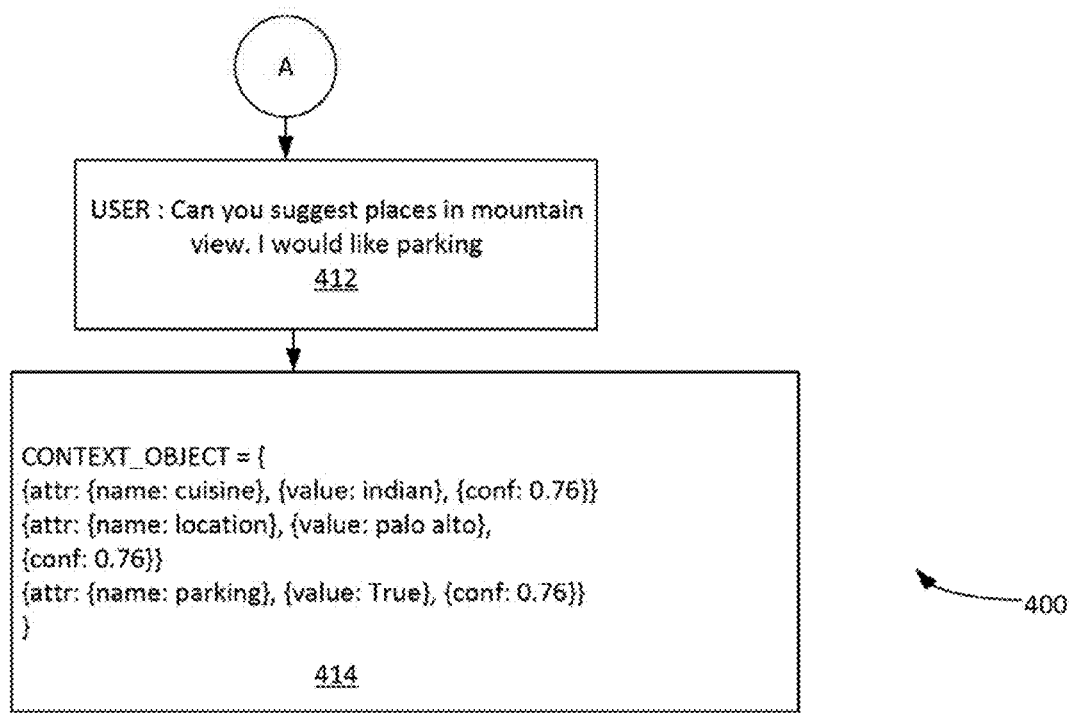

FIGS. 4 A-B illustrates an example of an implementation of a context object algorithm, according to some embodiments. Block 402 depicts a context object in an empty state. Block 404 depicts a user input string 'I am looking for food'. The user input can be text input, voice-to-text input, and the like. The context object can be updated based on the user input of block 404. For example, the systems and methods provided in FIGS. 1-3 (as well as, FIG. 5 in some examples) can be utilized to update the context object. Block 406 depicts an updated context object. The updated context object can include attributes derived from the content of the user input of block 404. For example, the updated context block can include a context object attribute with a 'name' (e.g. name=food). The updated context block can include a context object attribute with a 'value' (e.g. value=indian). The updated context block can include a context object attribute with a 'confidence' (e.g. conf.=0.76). Other context object attributes can be provided in various other examples and the present examples are provided by way of example and not of limitation. An example description of an operating principle of a context object update algorithm 500 is provided in FIG. 5, according to some embodiments. In some examples, context object update algorithm 500 can be utilized to update the context object of FIG. 4.

FIG. 6 provides an example of an extraction algorithm 600 (e.g. a rule engine algorithm) of a probabilistic information extraction rule engine, according to some embodiments. An information extraction engine can implement extraction algorithm 600 to extract complex attributes and facets from text (e.g. user input) based on information extraction rules and patterns. Key features can include the ability of users to extend an information extraction engine (e.g. information extraction engine 104) with domain-specific rules and/or patterns. Users can also extend the information extraction engine by writing code for complex patterns (make sure that there is at least one example of this). The information extraction engine can assign a probability to each extracted attribute feature (e.g. a confidence value as provided in FIG. 4 supra) based on number of occurrences, dealing with negation etc. In some examples, an information extraction rule can be of the form: {pattern: p, action: a}. An information extraction rule can be fired if the target string matches the pattern p. An action can be used to specify a set of facts that are asserted in the context knowledge base if the rule is fired. A rule base for a domain can include one or more rules. FIG. 7 provides an example pattern matching algorithm 700 for a probabilistic information extraction rule engine, according to some embodiments.

An example of an information extraction rule is now provided by way of example and not of limitation. It is noted that a pattern construct in an information extraction rule can have the following example operators:

S: Match string S.
?OR (A|B): Match either string A or string B.
?OPT(C): String C is optional.
?TYPE(T): String T can be programmatically defined.
?VAR_N: Ignore up to N strings.
?VAL(V): String V is programmatically defined and bound to variable V.

These constructs can be combined linearly or recursively as is provided in the following examples:

?OR (good|great) food: matches "good food" or "great food".
?OR (good ?OPT(tasting)|great food) matches "good food" or "great food" or "good tasting food".

The action construct can include a set of actions. Each action can asserts an (attribute=value|C) pair with a confidence 'C' in the context knowledge base when it is executed. Each action can be a five-tuple such as <attr, val, valType, valXform, conf>. The attribute ('attr') can have a value that is asserted when the action is executed. The value (val) of the attribute can be a primitive value such as a string or Boolean. The value can also be the value of variable (e.g. ?VAL_x) from the pattern construct. The value type (valType) can be a variable. The value type can be used to denote the type of the variable for the action to execute. For example, when the value type is 'Money', then the action is executed only the actual value of the variable is Money. When the value is a primitive, then value type can have the value 'None'. When the value is a variable, then a value transform function (valXform) can be written to transform the value. Confidence (conf) can provide the confidence of the value.

Figure 8A:
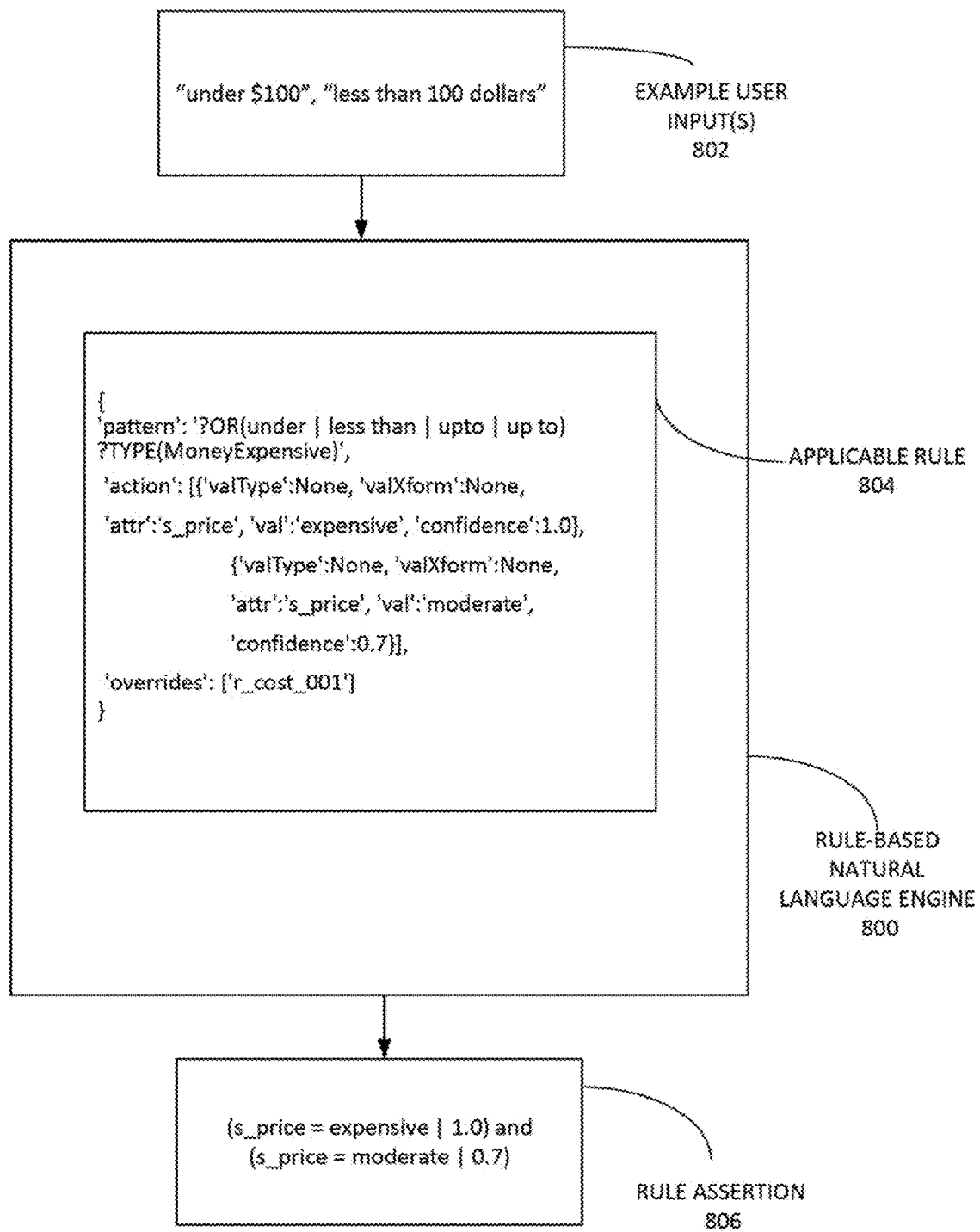

FIGS. 8 A-B illustrate example applications of a rule-based natural language engine 800, according to some embodiments. In FIG. 8A, a user input(s) 802 such as strings—"under $100" and/or "less than 100 dollars"—can be received by rule-based natural language engine 800. Rule-based natural language engine 800 can apply rule 804 to user input(s) 802. Rule-based natural language engine 800 can be included in an information extraction rule engine. 'MoneyExpensive' can be a function that returns true for any surface forms of a configurable dollar amount that is considered expensive such as '$100', '100 dollars' and/or 'a hundred dollars'. Rule assertion 806 can be generated by rule-based natural language engine 800 using rule 804. For example, in the present example, any of the input strings of user input(s) 802, rule assertion 806 can be included in the context knowledge base as: (s_price=expensive|1.0) and (s_price=moderate|0.7).

Figure 8B:
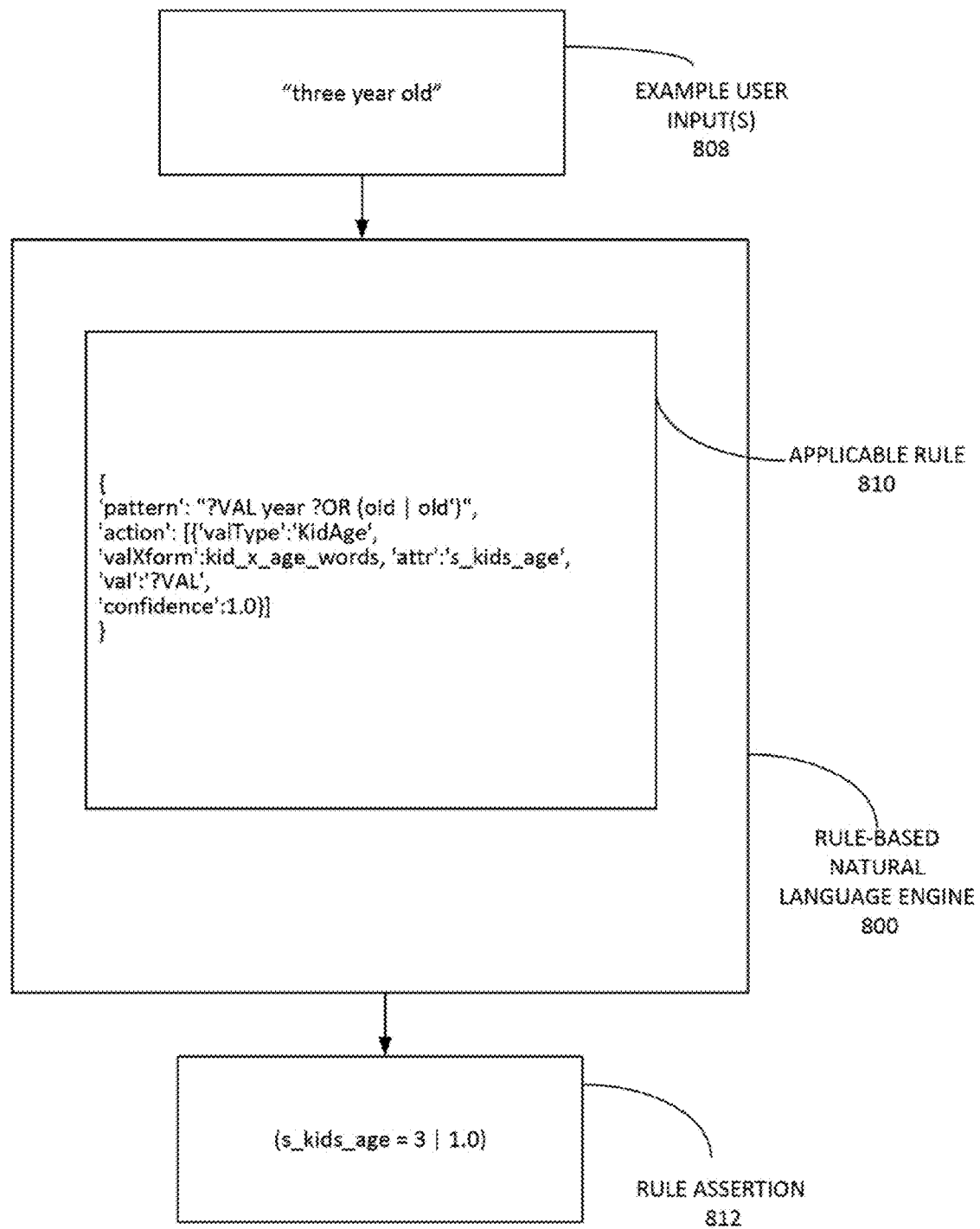

In FIG. 8B, a user input(s) 808 such as string—"under three years old"—can be received by rule-based natural language engine 800. Rule-based natural language engine 800 can apply rule 810 to user input(s) 808. 'KidAge' can be a function that returns true if the value of the variable that denotes a kids age in number or words (e.g., '2' or 'twelve'). 'kid_x_age_words' can be a function that converts the child's age either in numerical digits or words to the child's age in numerical digits. Rule assertion 812 can be generated by rule-based natural language engine 800 using rule 810. For example, in the present example, any of the input strings of user input(s) 808, rule assertion 812 can be included in the context knowledge base as: (s_kids_age=3|1.0).

The same information may be extracted multiple times by the same rule over consecutive rounds of interaction with the user or by different IE rules over the same NL input. Some of them may be in positive context and others may be in negative context. The Statistical IE Rule Engine calculates confidence score for each variable. Confidence score for a variable $f(I(vi))$ is defined as follows:

$$f(I(v_i)) = \frac{1}{\log_2(|I(v_i)| + 1)} \sum_{v \in I(v_i)} \alpha(v) C(v)$$

The elements of this equation can be defined as follows. C(v) can be the confidence in the information-extraction rule that extracted the attribute-value pair from the user's NL input, α(v) can be an indicator function for whether a particular value occurred within a negated context.

$$\alpha(v) = \begin{cases} 1, & \text{if } N(v) = F \\ -1, & \text{if } N(v) = T \end{cases}$$

I(vi) is the collection of all occurrences of the value vi extracted from the user's NL input. Moreover, when a value occurs within a negated context, the confidence of the IE rule used to extract the value can be adjusted accordingly based on the following equation:

$$C_N(v) = e^{(\frac{1}{N}-1)} C(v)$$

As provided supra, a discourse manager (e.g. discourse manger 110) can be used for interactive dialog with the users.

FIG. 9 depicts an example of a discourse state 900, according to some embodiments. In the present example, discourse state 900 can be executed when the attribute locality doesn't have a value in the context knowledge base. When discourse state 900 is executed a discourse manager (e.g. discourse manager 110 of FIG. 1) can pose one of the dialog sentences. An example of a questions posed by the discourse manger can be "Which city".

FIG. 10 depicts an example a discourse state 1000 with a response verify, according to some embodiments. Discourse state 1000 can be executed when the attribute groups_good_for has the value 'None' and the attribute event_type has the value 'birthday' in the context knowledge base. When discourse state 1000 is executed, either of the sentences from the dialog object can be shown to the user (e.g. with a display of a computing device). The discourse manager can expect the user to enter a response which matches a specified response pattern. In this case, the response pattern can specify a number of people either in words or numbers. The examples of FIGS. 9-10 are provided by way of example and not of limitation. Additional example discourses are provided in the various user engagement examples provided infra in the screen shot views of example implementation of the above systems and methods.

FIG. 11 depicts an exemplary computing system 1100 that can be configured to perform several of the processes provided herein. In this context, computing system 1100 can include, for example, a processor, memory, storage, and I/O devices (e.g., monitor, keyboard, disk drive, Internet connection, etc.). However, computing system 1100 can include circuitry or other specialized hardware for carrying out some or all aspects of the processes. In some operational settings, computing system 1100 can be configured as a system that includes one or more units, each of which is configured to carry out some aspects of the processes either in software, hardware, or some combination thereof.

FIG. 11 depicts a computing system 1100 with a number of components that can be used to perform any of the processes described herein. The main system 1102 includes a motherboard 1104 having an I/O section 1106, one or more central processing units (CPU) 1108, and a memory section 1110, which can have a flash memory card 1112 related to it. The I/O section 1106 can be connected to a display 1114, a keyboard and/or other attendee input (not shown), a disk storage unit 1116, and a media drive unit 1118. The media drive unit 1118 can read/write a computer-readable medium 1120, which can include programs 1122 and/or data. Computing system 1100 can include a web browser. Moreover, it is noted that computing system 1100 can be configured to include additional systems in order to fulfill various functionalities. Display 1114 can include a touch-screen system. In some embodiments, system 1100 can be included in and/or be utilized by the various systems and/or methods described herein. As used herein, a value judgment can refer to a judgment based upon a particular set of values or on a particular value system.

FIG. 12 is a block diagram of a sample computing environment 1200 that can be utilized to implement various embodiments. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 may be in the form of a data packet adapted to be transmitted between two or more computer processes. The system 1200 includes a communication framework 1210 that can be employed to facilitate communications between the client(s) 1202 and the server(s) 1204. The client(s) 1202 are connected to one or more client data store(s) 1206 that can be employed to store information local to the client(s) 1202. Similarly, the server(s) 1204 are connected to one or more server data store(s) 1208 that can be employed to store information local to the server(s) 1204.

Example User Interfaces

Figure 13:
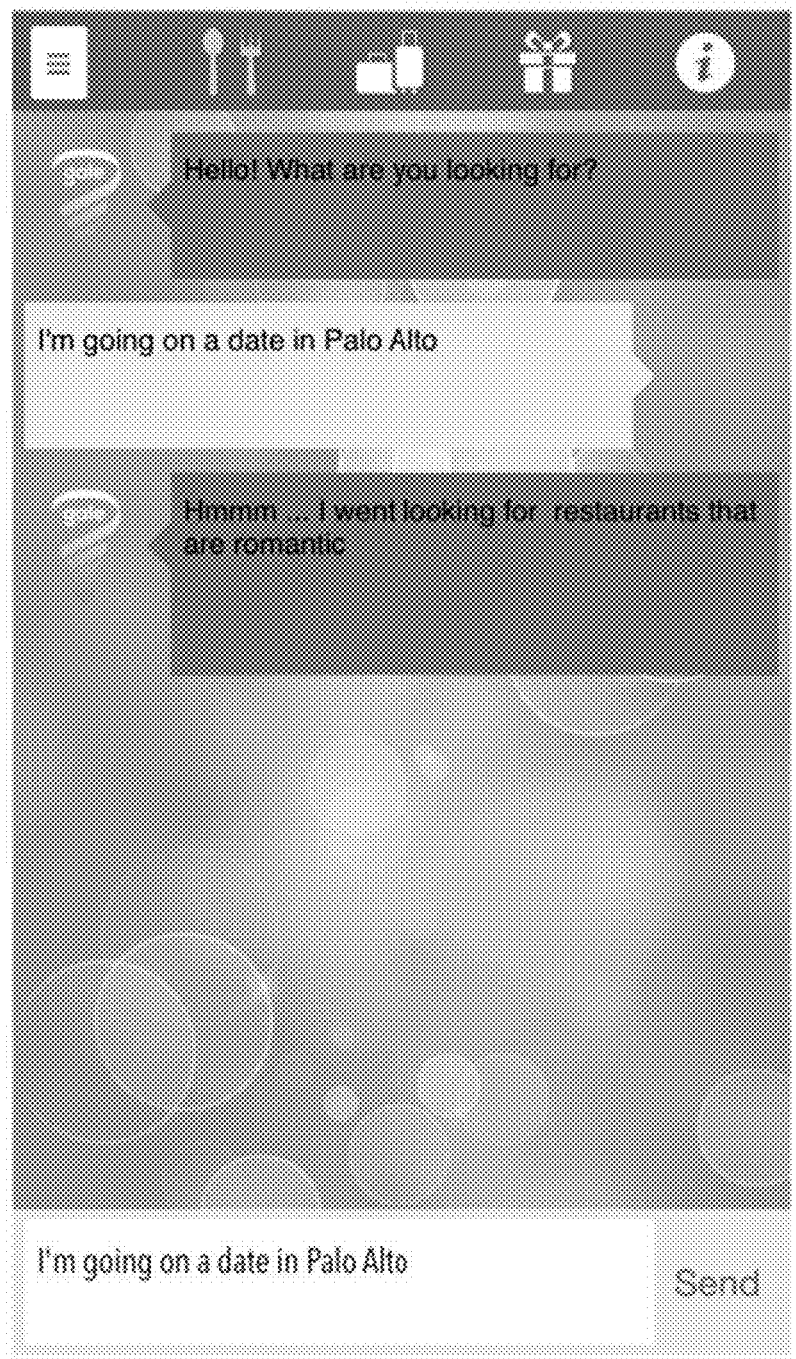
Figure 14:
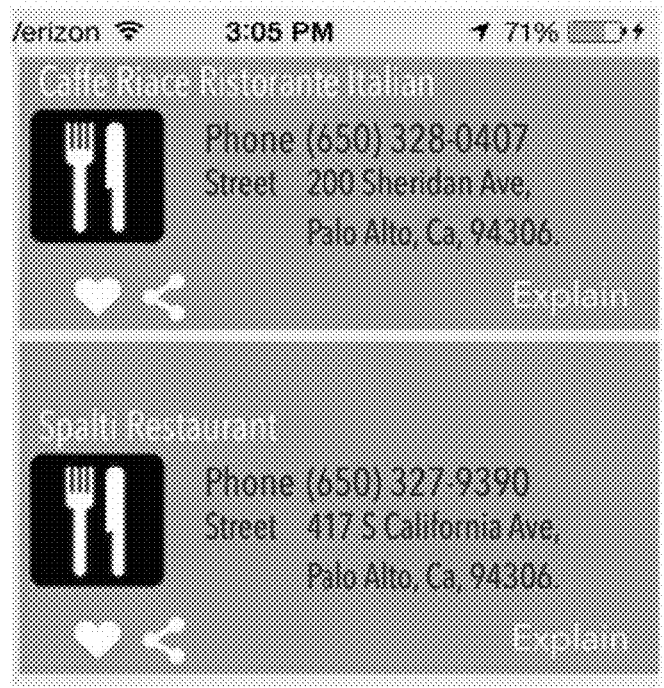
Figure 15:
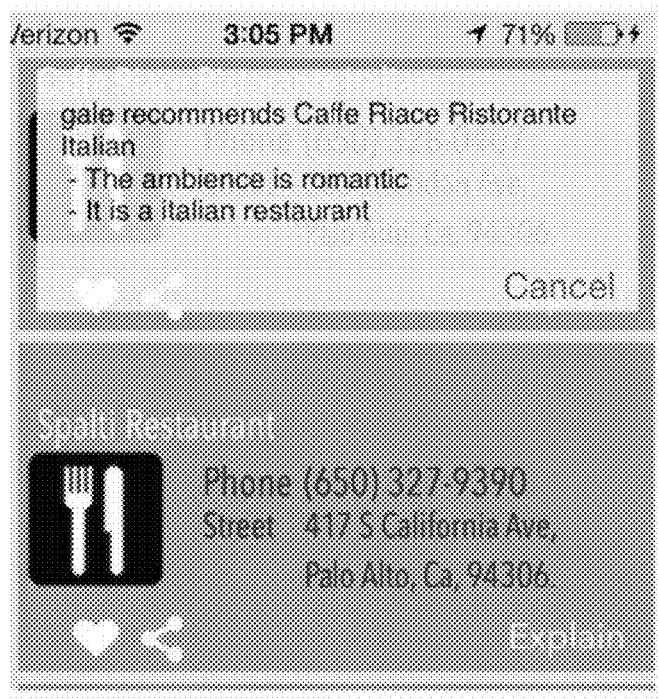
Figure 16:
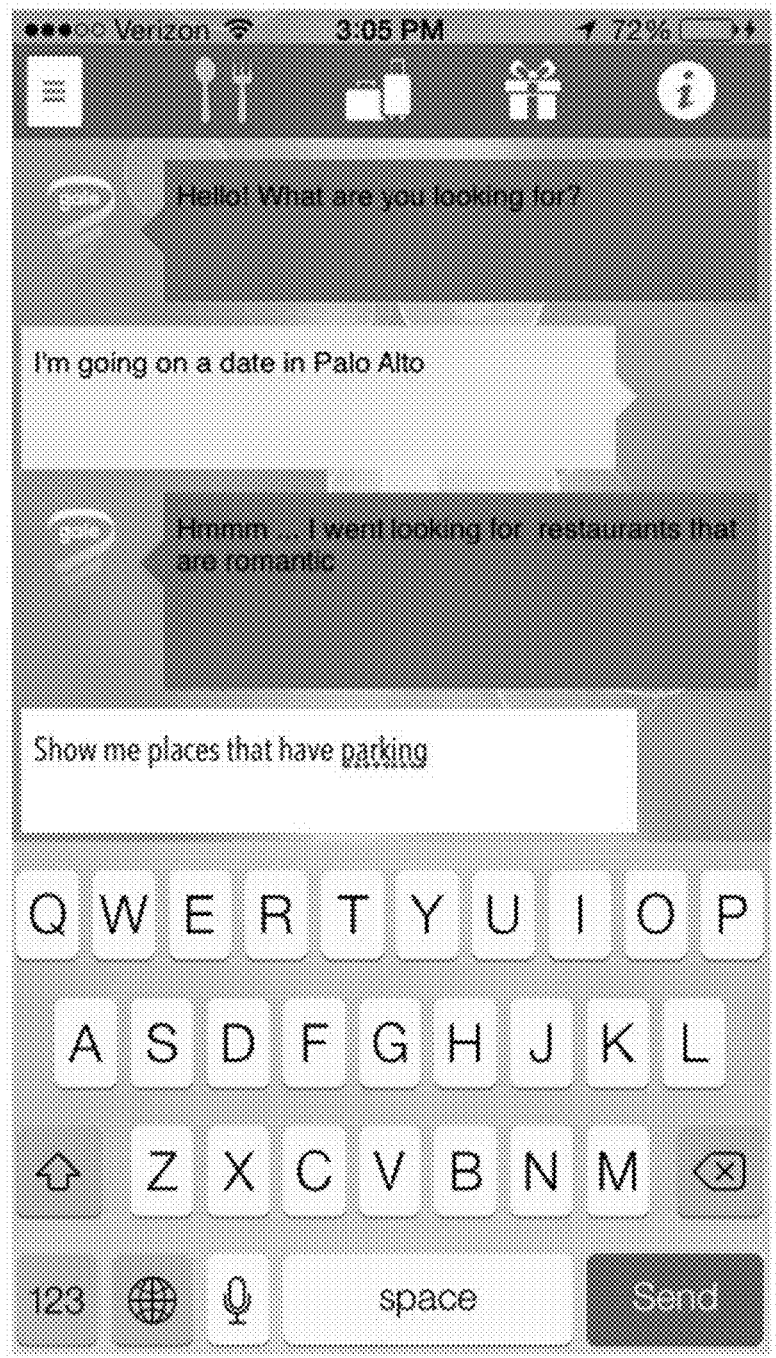
Figure 17:
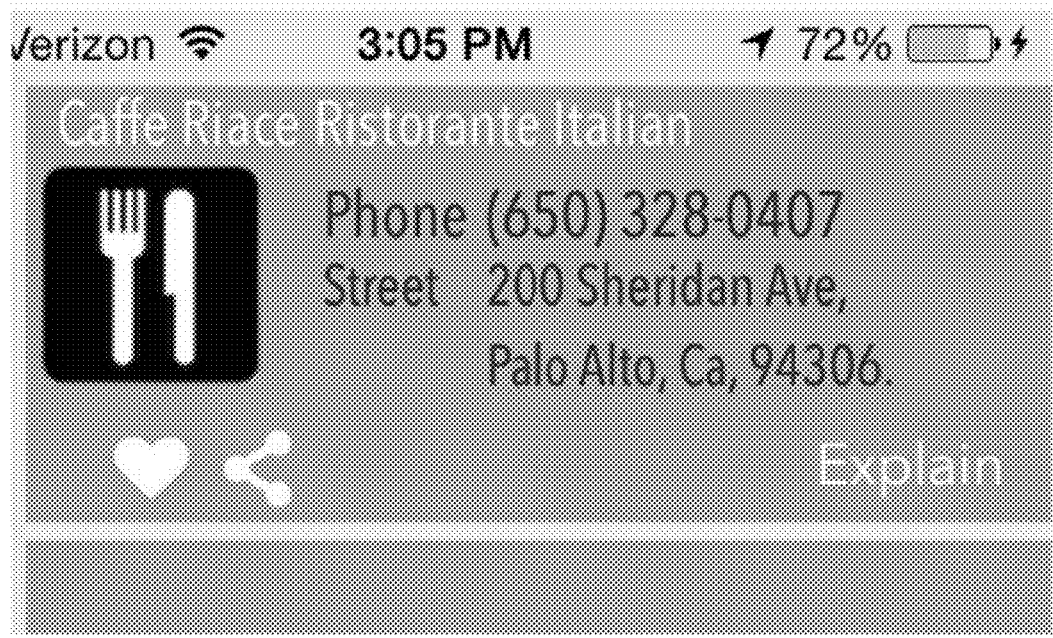
Figure 18:
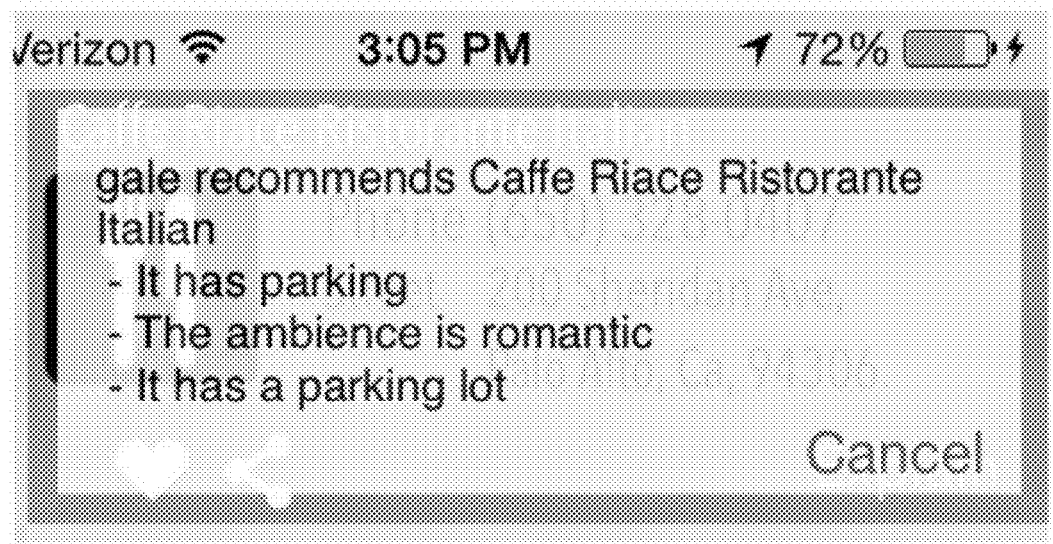
Figure 19:
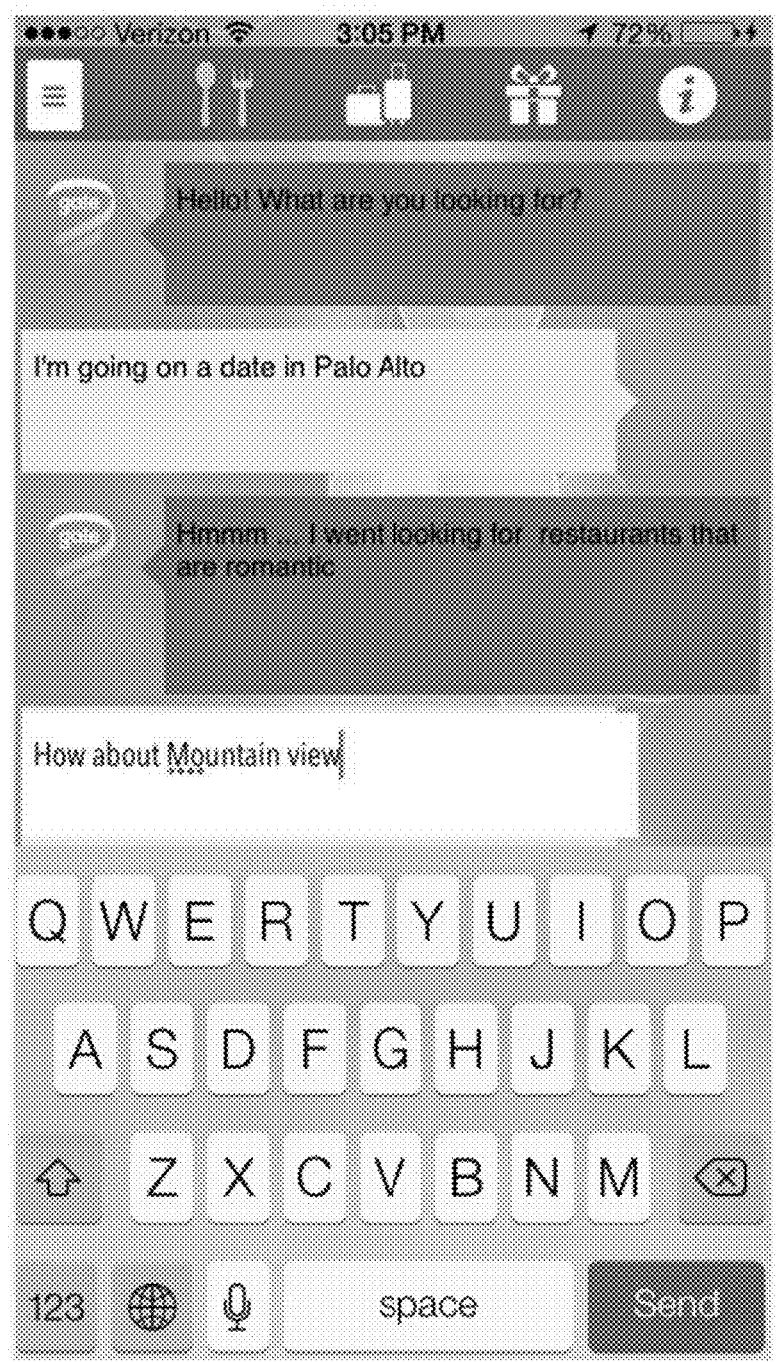
Figure 20:
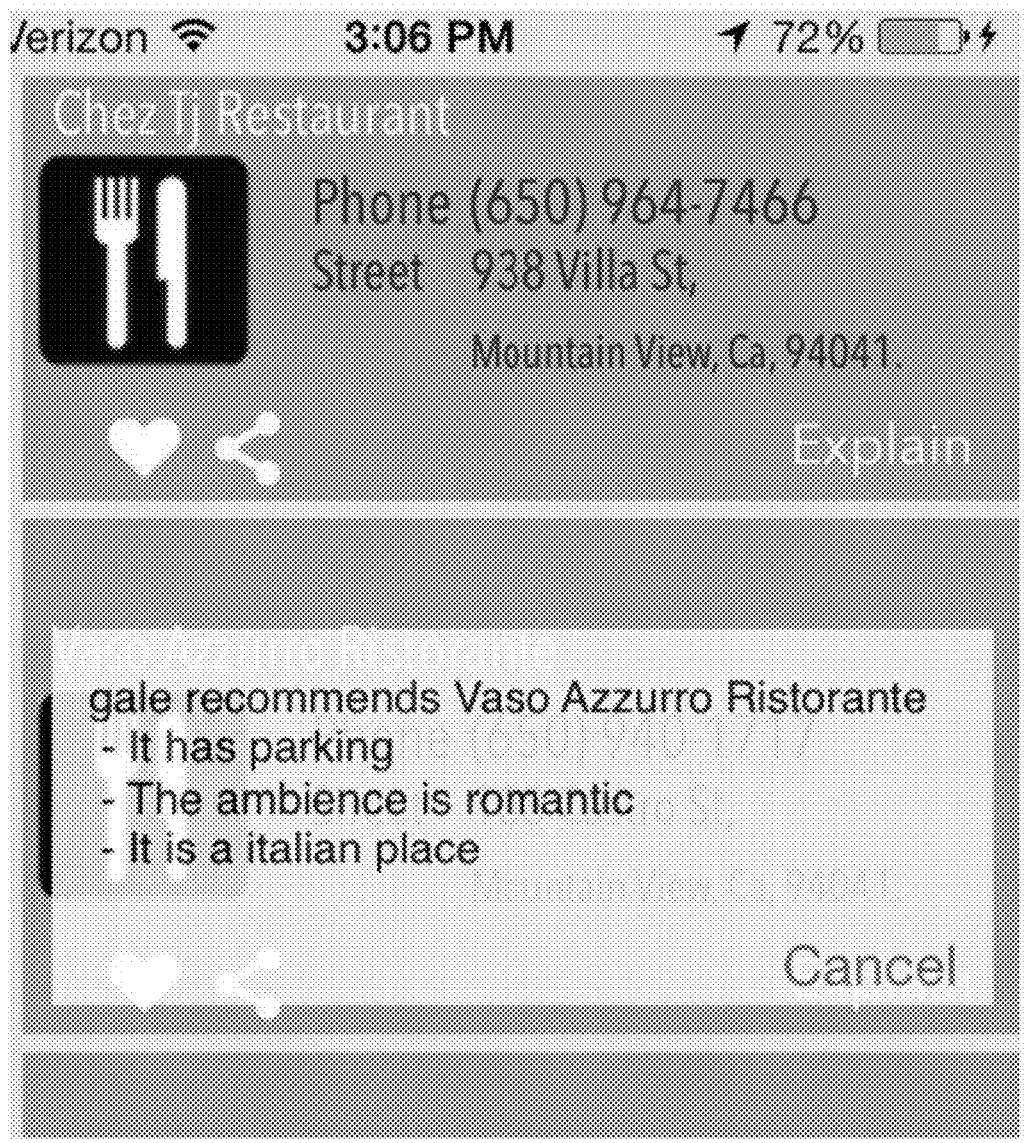

FIGS. 13-20 depict an example set of screen shot views of example implementation of the systems and process provided herein, according to some embodiments. For example, system 100 can implement a software agent referred to in the figures as 'gale'. In FIG. 13, a user provides a query to system 100 and system 100 provides a response. In FIG. 14, the restaurants referred to by system 100 in FIG. 13 are displayed to the user. In FIG. 15, system 100 can provide a more specific recommendation to the user. In FIG. 16, the user can input an additional query (e.g. request information about parking). In FIGS. 17 and 18, system 100 can update the query results based on the additional user input. In FIG. 19, the user can provide another user input (e.g. change the location of the date). System 100 can update the query results based on the most recent input from the user as well as previous user input. This update output can be provided in FIG. 20.

Additional Example Implementations

FIG. 21 illustrates an example semantic discourse state 2100, according to some embodiments. Semantic discourse state 2100 can be activated when the user specifies an interest, rather than a category of interest. For example, a discourse manager can query the semantic model to obtain one or more categories related to that interest. The category_constraint variable of semantic discourse state 2100 can specify additional constraints, for example, in this case it can show categories related to males.

FIG. 22 illustrates an example of a query plan, according to some embodiments. A user query 2202 can be received. The user query can be "Find me Italian places that serve good wine". A query plan 2204 can be generated. The query plan 2204 can include step 2206 of querying a restaurant database (DB) using structured attributes. In step 2208, a query restaurants reviews DB can be queried for restaurants matching user query 2202 using unstructured data analysis. In step 2210, the results of step 2206 and 2208 can be combined. The example of FIG. 22 can be modified to implement other query plans. For example, a user query for "I would like see a movie and also like to eat dinner at a steakhouse" can be received. In this example, the query plan can include using a search engine or other search functionality to locate theater near the user using the movies API. For each theater, one or more steakhouses within a specified distance can be located. Information about the theaters and/or steakhouses can be obtained as well (e.g. from an Internet search engine, from an Internet-based mapping service and the like). The two results can be combined. In another example, the user query can be "Show me expense reports for my trip to Vegas". The query plan can include the step of querying an expense enterprise resource planning (ERP) system to find relevant expense reports based on information extracted from user query. If there are no matches, then a query for the last five results can be requested from the expense ERP system. These examples are provided by way of instruction and not of limitation.

FIG. 23 illustrates an example of an API semantic registry, according to some embodiments. Blocks 2302 through 2310 represent various categories provided in a hierarchal manner. Each category can have a list of preferred APIs. APIs listed for a parent category can be available for a child category. For example, the amazon.com API can be available for all the listed example categories.

FIG. 24 illustrates an example implementation of an enterprise system connector layer (e.g. using enterprise system connector 134), according to some embodiments. Enterprise connector 134 can leverage various semantic models of common processes, data, policies and constraints to build an enterprise abstract layer 2402 that is connected to existing enterprise systems such as SAP ERP 2402, Oracle ERP 2404, Salesforce.com 2408, Microsoft Sharepoint (not shown), etc. Enterprise abstract layer 2402 can provided integrated access for various web and/or mobile related applications.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A context user engagement system for automatically engaging in a conversation with a user comprising:
   a context manager that manages, with at least one processor, the context of the conversation with a user, wherein the context manager receives a user utterance, wherein the context manager calls the other modules of the contextual user engagement system to obtain information with respect to the user utterance, wherein the context manager maintains a context object for a conversation with a user, wherein the context manager automatically updates the context object based on an information detected by the other modules of contextual user engagement system;
   a content knowledge database to store a content knowledge of the contextual user engagement system, wherein the content knowledge comprises a history of interactions with the user;
   an information extraction engine that extracts information from a specified source based on a set of rules, wherein the information extraction engine extracts attributes and facets from the user utterance based on information extraction rules and patterns, wherein the information extraction engine assigns a probability to each extracted attribute based on a number of occurrences of the attribute, wherein the information extraction engine calculates a confidence value to the attribute, wherein the confidence value is defined as $$f(I(v_i)) = \frac{1}{\log_2(|I(v_i)| + I)} \sum_{v \in I(v_i)} \alpha(v) C(v)$$

wherein C(v) comprises a confidence in the information-extraction rule that extracted the attribute-value pair from the user utterance, wherein a(v) comprises an indicator function for whether a particular value occurred within a negated context, and wherein I(vi) comprises a collection of occurrences of a value extracted from the user utterance;
   a contextual topic engine that extracts topics and entities from text provided by a user based on a specified semantic model;
   a discourse manager that provide an interactive dialog with the user;
   a natural language generation module that generates an explanation for results and appropriate utterances to be communicated to the user; and
   an inference engine that infers a facts or a user intent based on at least one of an inference rules, the specified semantic model or a set of information in the context object.

2. The contextual user engagement system of claim 1, further comprising:
   a query engine that comprises connectors for at least one of a database, an application programming interface engine, an enterprise system connect or an engine for analyzing unstructured data.

3. The contextual user engagement system of claim 1, further comprising:
   an execution engine that generates a query plan and communicates the query plan to the query engine.

4. The contextual user engagement system of claim 1, wherein a context object update algorithm is utilized to update the context object.

5. The contextual user engagement system of claim 1, wherein a value occurs within a negated context, the confidence value is defined as:

$$C_N(v) = e^{(\frac{1}{N}-1)}C(v).$$

6. The contextual user engagement system of claim 5, where the information extraction engine receives domain-specific rules and patterns from a user.

7. The contextual user engagement system of claim 6, wherein an information extraction rule is based on the form of pattern variable and an action variable, wherein the information extraction rule is fired when target string in the user utterance matches the pattern variable, and wherein the action variable is used to specify a set of facts that are asserted in the context knowledge base when the rule is implemented.

8. The contextual user engagement system of claim 1, wherein the information in the context-knowledge base is represented as at one semantic model.

9. The contextual, user engagement system of claim 8, wherein the contextual topic engine utilizes a semantic similarity between flee context object and a candidate topic to determine a most likely topic to extract.

10. A contextual user engagement method for automatically engaging in a conversation with a user comprising:
receiving a user utterance with a context manager;
communicating, with the context manager, a user text a context identifier to an extraction engine, wherein the user text is obtained from the user utterance;
creating, with the context manager, a context object associated with the user utterance;
extracting, topics and attributes from the user text with the extraction engine, wherein the extraction engine extracts attributes and facets from the user utterance based on information extraction rules and patterns, wherein the extraction engine assigns a probability to each extracted attribute based on a number of occurrences of the attribute, wherein the extraction engine calculates a confidence value to the attribute, wherein the confidence value is defined as $$f(I(v_i)) = \frac{1}{\log_2(|I(v_i)|+1)} \sum_{v \in I(v_i)} \alpha(v)C(v),$$

wherein C(v) comprises a confidence in the information-extraction rule that extracted the attribute-value pair from the user utterance, wherein a(v) comprises an indicator function for whether a particular value occurred within a negated context, and wherein I(vi) comprises a collection of occurrences of a value extracted from the user utterance, wherein when value occurs within a negated context, the confidence value is defined as:

$$C_N(v) = e^{(\frac{1}{N}-1)}C(v);$$

communicating the topics and attributes to the context manager;
updating, with the context manager, the context object context manager with topics and attributes;
communicating the context object to a semantic engine;
updating the context object, with the semantic engine, based on at least one of an inference rule or a semantic model;
communicating the context object to a discourse manager;
using discourse states and dialogs to determine a system utterance for the user,
wherein a system utterance comprises an automatically generated response generated with at least one processor;
generating a query plan;
sending the updated context object and user intent to execution engine;
querying an entity for additional information relevant to the system utterance;
converting the additional information from to additional sentence in a user-readable natural language state;
adding additional sentences to the system utterance; and
communicating the system utterance to at least one of a user device or a user application.

11. The contextual user engagement method of claim 10, wherein the entity queried for additional information relevant to the system utterance comprises at least one of an SQL database, an application programming interface, an enterprise system connector or an engine for analyzing unstructured data.

12. The contextual user engagement method of claim 11, wherein the inference rule comprises one or more functions that obtains a premise, analyzes a syntax of the premise, and returns one or more conclusions.

13. A computerized system comprising:
a processor configured to execute instruction;
a memory containing instructions when executed on the processor, causes the processor to perform operations that:
receive a user utterance with a context manager;
communicate, with the context manager, a user text an context identifier to an extraction engine, wherein the user text is obtained from the user utterance;
create, with the context manager, a context object associated with the user utterance;
extract topics and attributes from the user text with the extraction engine, wherein the extraction engine assigns a probability to each extracted attribute based on a number of occurrences of the attribute, wherein the extraction engine calculates a confidence value to the attribute, wherein the confidence value is defined as $$f(I(v_i)) = \frac{1}{\log_2(|I(v_i)|+I)} \sum_{v \in I(v_i)} \alpha(v)C(v);$$

communicate the topics and attributes to the context manager;
update, with the context manager, the context object context manager with topics and attributes;
communicate the context object to a semantic engine;
update the context object, with the semantic engine, based on at least one of an inference rule or a semantic model;
communicate the context object to a discourse manager;

use discourse states, and dialogs to determine a system utterance for the user, wherein a system utterance comprises an automatically generated response generated with at least one processor;
generate a query plan;
send the updated context object and user intent to execution engine;
query a database for additional information relevant to the system utterance;
convert the additional information from to additional sentence in a user-readable natural language state;
add additional sentences to the system utterance; and
communicate the system utterance to at least one of a user device or a user application.

14. A computerized system of claim 13, wherein $C(v)$ comprises a confidence in the information-extraction rule that extracted the attribute-value pair from the user utterance, wherein $a(v)$ comprises an indicator function for whether a particular value occurred within a negated context, and wherein $I(vi)$ comprises a collection of occurrences of a value extracted from the user utterance.

* * * * *